US011010881B2

United States Patent
Toussaint et al.

(10) Patent No.: US 11,010,881 B2
(45) Date of Patent: May 18, 2021

(54) SECOND-HARMONIC PATTERNED POLARIZATION-ANALYZED REFLECTION CONFOCAL MICROSCOPE

(71) Applicant: The Board of Trustees of the University of Illinois, Urbana, IL (US)

(72) Inventors: Kimani C. Toussaint, Champaign, IL (US); Chukwuemeka O. Okoro, Quincy, MA (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 56 days.

(21) Appl. No.: 16/411,764

(22) Filed: May 14, 2019

(65) Prior Publication Data

US 2019/0355106 A1 Nov. 21, 2019

Related U.S. Application Data

(60) Provisional application No. 62/672,114, filed on May 16, 2018.

(51) Int. Cl.
*G06T 5/20* (2006.01)
*G06T 5/00* (2006.01)
(Continued)

(52) U.S. Cl.
CPC ............ *G06T 5/20* (2013.01); *G01B 9/02091* (2013.01); *G01J 3/2823* (2013.01); *G01N 21/65* (2013.01);
(Continued)

(58) Field of Classification Search
CPC ......... G06T 5/20; G06T 5/008; G06T 7/0012; G06T 2207/10056; G06T 2207/10101;
(Continued)

(56) References Cited

U.S. PATENT DOCUMENTS 7,084,977 B2   8/2006   Nomura
7,805,183 B2   9/2010   Keely et al.
(Continued)

FOREIGN PATENT DOCUMENTS

WO   2009/115943 A3   3/2009

OTHER PUBLICATIONS

Ambekar et al., "Quantifying collagen structure in breast biopsies using second-harmonic generation imaging," *Biomedical Optics Express* 3:9, pp. 2021-2035 (2012 ).
(Continued)

*Primary Examiner* — David F Dunphy
(74) *Attorney, Agent, or Firm* — Brinks Gilson & Lione

(57) ABSTRACT

The disclosure is directed to a method and apparatus for performing patterned microscopy. The method includes obtaining a microscopy image of an object based on optical signal from the object in response to a first incoming optical beam; and obtaining a contrast-enhancing image based on optical signal from the object in response to a second incoming optical beam. The method also includes generating a patterned mask based on the contrast-enhancing image. The method further includes applying the patterned mask on the microscopy image to obtain a patterned microscopy image. The microscopy image includes a polarization-analyzed reflection confocal microscopy image. The contrast-enhancing image includes a second-harmonic generation microscopy image. The patterned microscopy image includes a second-harmonic patterned polarization-analyzed reflection confocal microscopy image.

19 Claims, 15 Drawing Sheets

(51) Int. Cl.
  G06T 7/00      (2017.01)
  G01B 9/02      (2006.01)
  G01J 3/28      (2006.01)
  G01N 21/65     (2006.01)
  G02B 21/00     (2006.01)
(52) U.S. Cl.
  CPC ............ G02B 21/008 (2013.01); G06T 5/008 (2013.01); G06T 7/0012 (2013.01); *G01N 2021/655* (2013.01); *G06T 2207/10056* (2013.01); *G06T 2207/10101* (2013.01); *G06T 2207/30024* (2013.01)
(58) Field of Classification Search
  CPC ....... G06T 2207/30024; G01B 9/02091; G01J 3/2823; G01N 21/65; G01N 2021/655; G02B 21/008
  See application file for complete search history.

(56) References Cited

U.S. PATENT DOCUMENTS

| | | | | |
|---|---|---|---|---|
| 2004/0012853 | A1* | 1/2004 | Garcia | G02B 21/008 359/489.07 |
| 2012/0170116 | A1* | 7/2012 | Gurton | G02B 5/30 359/485.01 |
| 2016/0343150 | A1* | 11/2016 | Mezghani | G06T 3/60 |
| 2020/0209602 | A1* | 7/2020 | Pau | G01M 11/331 |

OTHER PUBLICATIONS

Ambekar et al., "Quantitative second-harmonic generation microscopy for imaging porcine cortical bone: comparison to SEM and its potential to investigate age-related changes," *Bone* vol. 50, pp. 643-650 (2012).

Antonelli et al., "Mueller matrix imaging of human colon tissue for cancer diagnostics: how Monte Carlo modeling can help in the interpretation of experimental data," *Optics Express* 18:10, 10200-10208 (2010 ).

Applegate et al., "Polarization-resolved second-harmonic generation optical coherence tomography in collagen," *Optics Letters* 29:19, pp. 2252-2254 (2004).

Bancelin et al., "Determination of collagen fiber orientation in histological slides using Mueller microscopy and validation by second harmonic generation imaging," *Optics Express* 22:19, pp. 22561-22574 (2014).

Brown et al., "Dynamic imaging of collagen and its modulation in tumors in vivo using second-harmonic generation," *Nature Medicine* 9:6, pp. 796-800 (2003 ).

Chen et al., "Second harmonic generation tensor microscopy for tissue imaging," *Applied Physics Letters* vol. 94, pp. 1-4 (2009).

Chen et al., "Second harmonic generation microscopy for quantitative analysis of collagen fibrillar structure," *Nature Protocols* 7:4, pp. 654-669 (2012).

Dalgleish, "The human type I collagen mutation database," *Nucleic Acids Research* 25:1, pp. 181-187 (1997).

De Boer et al., "Imaging thermally damaged tissue by polarization sensitive optical coherence tomography," *Optics Express* 3:6, pp. 212-218 (1998).

Di Lullo et al., "Mapping the Ligand-Binding Sites and Disease-Associated Mutations on the Most Abundant Protein in the Human, Type I Collagen," *Journal of Biological Chemistry* 277:6, pp. 4223-4231 (2002).

Du et al., "Mueller matrix polarimetry for differentiating characteristic features of cancerous tissues," *Journal of Biomedical Optics* 19:7, pp. 1-9 (2014).

Dubreuil et al., "Mueller matrix polarimetry for improved liver fibrosis diagnosis," *Optics Letters*, 37:6, pp. 1061-1063 (2012).

Ellingsen et al., "Mueller matrix three-dimensional directional imaging of collagen fibers," *Journal of Biomedical Optics* 19:2, pp. 1-7 (2014 ).

Erikson et al., "Quantification of the second-order nonlinear susceptibility of collagen I using a laser scanning microscope," *Journal of Biomedical Optics* 12:4, pp. 1-10 (2007 ).

Fercher et al., "Optical coherence tomography-principles and applications," *Reports on Progress in Physics* vol. 66, pp. 239-303 (2003).

Freudiger et al., "Label-free biomedical imaging with high sensitivity by stimulated Raman scattering microscopy." *Science*, 322:19 pp. 1857-1861. (2008).

Fujimoto et al., "Optical Coherence Tomography (OCT) in Ophthalmology," *Optics Express*, 17:5, pp. 3978-3979 (2009).

Fujimoto, "Optical coherence tomography for ultrahigh resolution in vivo imaging," *Nature Biotechnology* 21:11, pp. 1361-1367 (2003).

Giattina et al., "Assessment of coronary plaque collagen with polarization sensitive optical coherence tomography (PS-OCT)," *International Journal of Cardiology* vol. 107, pp. 400-409 (2006 ).

Glazer et al., "An automatic optical imaging system for birefringent media," *Proceedings of the Royal Society of London A*, vol. 452, pp. 2751-2765.

Gora et al., "Endoscopic optical coherence tomography: technologies and clinical applications," *Biomedical Optics Express*, 8:5, pp. 2405-2444 (2017).

Gosain et al., "Aging and wound healing," *World Journal of Surgery* 28:3, pp. 321-326 (2004).

Hompland et al., "Second-harmonic generation in collagen as a potential cancer diagnostic parameter," *Journal of Biomedical Optics* 13:5, pp. 1-11 (2008).

Jang et al., "In Vivo Characterization of Coronary Atherosclerotic Plaque by Use of Optical Coherence Tomography," *Circulation*, 111:12, pp. 1551-1555 (2005).

Jiao et al., "Two-dimensional depth-resolved Mueller matrix of biological tissue measured with double-beam polarization-sensitive optical coherence tomography," *Optics Letters* 27:2, pp. 101-103 (2002).

Kumar et al., "Comparative study of differential matrix and extended polar decomposition formalisms for polarimetric characterization of complex tissue-like turbid media," *Journal of Biomedical Optics* 17:10, pp. 105006-105006 (2012).

Lake et al., "Mechanical and Structural Contribution of Non-Fibrillar Matrix in Uniaxial Tension: A Collagen-Agarose Co-Gel Model," *Annals of Biomedical Engineering* 39:7, pp. 1891-1903 (2011).

Lara et al., "Axially resolved complete Mueller matrix confocal microscopy," *Applied Optics* 45:9, pp. 1917-1930 (2006 ).

Lau et al., "Quantification of collagen fiber organization using three-dimensional Fourier transform-second-harmonic generation imaging," *Optics Express* 20:19, pp. 21821-21832 (2012).

Lee et al., "Third-harmonic generation imaging of breast tissue biopsies," *Journal of Microscopy*, 264:2 pp. 175-181 (2016).

Longo et al., "Laser skin rejuvenation: epidermal changes and collagen remodeling evaluated by in vivo confocal microscopy," *Lasers in Medical Science* vol. 28, pp. 769-776 (2013 ).

Lu et al., "Interpretation of Mueller matrices based on polar decomposition," *J. Opt. Soc. Am. A.* 13:5, pp. 1106-1113 (1996 ).

Martin et al., "Collagen fiber organization is related to mechanical properties and remodeling in equine bone. A comparison of two methods," *Journal of Biomechanics* 29:12, pp. 1515-1521 (1996).

Masters et al., "Rapid Observation of Unfixed, Unstained Human Skin Biopsy Specimens With Confocal Microscopy and Visualization," *Journal of Biomedical Optics* 2:4, pp. 437-445 (1997).

O'Connell et al., "Theoretical and Uniaxial Experimental Evaluation of Human Annulus Fibrosus Degeneration," *Journal of Biomechanical Engineering*, vol. 131, pp. 111007-1-111007-7 (2009).

Okoro et al., "Second-Harmonic Patterned Polarization-Analyzed Reflection Confocal Microscope," *J. Biomedical Optics* 22:8, pp. 1-9 (2017).

Okoro et al., "Second-Harmonic Patterned Polarization-Analyzed Reflection Confocal Microscope of Collagen," *Conference paper at*

(56) References Cited

OTHER PUBLICATIONS

*OSA Annual Meeting Frontiers in Optics + Laser Science* (Sep. 17-21, 2017)—accepted on Jun. 28, 2017.

Okoro et al., "Experimental demonstration of two-photon Mueller matrix second-harmonic generation microscopy," *Journal of Biomedical Optics* 21:1, pp. 1-7 (2016).

Oldenbourg et al., "New polarized light microscope with precision universal compensator," *Journal of Microscopy* 180:2, pp. 140-147 (1995).

Ottani et al., "Collagen structure and functional implications," *Micron* vol. 32, pp. 251-260 (2001).

Pawley et al., "Handbook of biological confocal microscopy," *Optical Engineering* 35:9, pp. 2765-2766 (1996).

Pereira et al., "Superresolution by means of polarisation, phase and amplitude pupil masks," *Optics Communications* 234:1, pp. 119-124 (2004).

Pezzaniti et al., "Mueller matrix scatter polarimetry of a diamond-turned mirror," *Optical Engineering* 34:6, pp. 1593-1598 (1995).

Pierce et al., "Birefringence measurements in human skin using polarization-sensitive optical coherence tomography," *Journal of Biomedical Optics* 9:2, pp. 287-291 (2004).

Provenzano et al., "Collagen reorganization at the tumor-stromal interface facilitates local invasion," *BMC Medicine* 4:38 pp. 1-16 (2006).

Raghunathan et al., "Rapid vibrational imaging with sum frequency generation microscopy," *Optics Letters*, 36:19, pp. 3891-3893 (2011).

Rao et al., "Fourier transform-second-harmonic generation imaging of biological tissues," *Optics Express* 17:17, pp. 14534-14542 (2009).

Rao, "Quantification of collagen fiber organization in biological tissues at cellular and molecular scales using second-harmonic generation imaging," *PhD thesis*, University of Illinois at Urbana-Champaign, (2012).

Rich et al., "Collagen and Picrosirius Red Staining: A Polarized Light Assessment of Fibrillar Hue and Spatial Distribution," *Braz. J. Morphol. Sci.* 22:2, pp. 97-104 (2005).

Rieppo et al., "Practical Considerations in the Use of Polarized Light Microscopy in the Analysis of the Collagen Network in Articular Cartilage," *Microscopy Research and Technique* vol. 71, pp. 279-287 (2008).

Samim et al., "Double Stokes Mueller polarimetry of second harmonic generation in ordered molecular structures," *J. Opt. Soc. Am. B*, 32:3, pp. 451-461 (2015).

Schmitt, "Optical coherence tomography (OCT): a review," *IEEE Journal of Selected Topics in Quantum Electronics* 5:4, pp. 1205-1215 (1999).

Schriefl et al., "Quantitative assessment of collagen fibre orientations from two-dimensional images of soft biological tissues," *Journal of the Royal Society Interface* vol. 9:, pp. 3081-3093 (2012).

Shi et al., "Generalized Stokes-Mueller formalism for two-photon absorption, frequency doubling, and hyper-Raman scattering," *Physical Review* A 49:3, pp. 1999-2015 (1994).

Sivaguru et al., "Quantitative analysis of collagen fiber organization in injured tendons using Fourier transform-second harmonic generation imaging," *Optics Express* 18:24, pp. 24983-24993 (2010).

Spiesz et al., "A quantitative collagen fibers orientation assessment using birefringence measurements: Calibration and application to human osteons," *Journal of Structural Biology*, vol. 176, pp. 302-306 (2011).

Stoller et al., "Quantitative second-harmonic generation microscopy in collagen," *Applied Optics* 42:25, pp. 5209-5219 (2003).

Sun et al., "Investigating Mechanisms of Collagen Thermal Denaturation by High Resolution Second-Harmonic Generation Imaging," *Biophysical Journal*, vol. 91, pp. 2620-2625 (2006).

Theodossiou et al., "Second Harmonic Generation Confocal Microscopy of Collagen Type I from Rat Tendon Cryosections," *Biophysical Journal*, vol. 91, pp. 4665-4677 (2006).

Tsai et al., "Imaging granularity of leukocytes with third harmonic generation microscopy," *Biomedical Optics Express*, 3:9, pp. 2234-2243 (2012).

Van Turnhout et al., "Modeling optical behavior of birefringent biological tissues for evaluation of quantitative polarized light microscopy," *Journal of Biomedical Optics* 14:5, pp. 1-11 (2009).

Wang et al., "Coherent Anti-Stokes Raman Scattering Imaging of Axonal Myelin in Live Spinal Tissues," *Biophysical Journal*, vol. 89, pp. 581-591 (2005).

Wang et al., "Roles of linear and circular polarization properties and effect of wavelength choice on differentiation between ex vivo normal and cancerous gastric samples," *Journal of Biomedical Optics* 19:4, pp. 1-11 (2014).

Wells, "The Role of Matrix Stiffness in Regulating Cell Behavior," *Hepatology* 47:4, pp. 1394-1400 (2008).

Whittaker et al., "Quantitative assessment of myocardial collagen with picrosirius red staining and circularly polarized light," *Basic Research in Cardiology*, vol. 89, pp. 397-410 (1994).

Williams et al., "Interpreting Second-Harmonic Generation Images of Collagen I Fibrils," *Biophysical Journal* vol. 88, pp. 1377-1386 (2005).

Winkler et al., "Three-Dimensional Distribution of Transverse Collagen Fibers in the Anterior Human Corneal Stroma," *Investigative Ophthalmology & Visual Science* 54:12, pp. 7293-7301 (2013).

\* cited by examiner

SECOND-HARMONIC PATTERNED POLARIZATION-ANALYZED REFLECTION CONFOCAL MICROSCOPE

RELATED APPLICATION

This application claims priority to Provisional Application No. 62/672,114, filed on May 16, 2018, which is incorporated by reference in its entirety.

BACKGROUND

1. Technical Field

The present disclosure is directed to a method and device for improving microscope technologies, particularly for obtaining patterned microscopy images to enhance contrast.

2. Background Information

Collagen is the most prevalent protein in the human body and as part of the extracellular matrix (ECM), it plays an important role in regulation of cell behavior. For type I fibrillar collagen, properties such as alignment, structural organization and polarization response, have been shown to affect and/or depend on tumor progression, bone development, aging and wound healing. It has even been suggested that part of the embedding ground matrix having little fiber content (called the extra-fibrillar matrix or EFM) affects degeneration remodeling and mechanical behavior. Hence, quantification of collagen and the surrounding EFM plus cell (EFMC) properties can provide a framework for objective assessment of tissues, and for more accurately monitoring sensitive changes.

The existing microscopy techniques for obtaining microscopy images of collagen have some disadvantages, such as low contrast, low sensitivity, and/or low specificity, thus making it difficult to discriminating between collagenous and noncollagenous regions.

The present disclosure describes a method and device for obtaining patterned microscopy images to solve at least some of the above drawbacks.

BRIEF SUMMARY

The present disclosure is directed to a method for performing patterned microscopy. The method includes obtaining a microscopy image of an object based on optical signal from the object in response to a first incoming optical beam; and obtaining a contrast-enhancing image based on optical signal from the object in response to a second incoming optical beam. The method also includes generating a patterned mask based on the contrast-enhancing image. The method further includes applying the patterned mask on the microscopy image to obtain a patterned microscopy image.

The present disclosure describes an apparatus for performing patterned microscopy on a subject. The apparatus includes an optical setup including a plurality of optical components. The apparatus includes a memory storing instructions; and a processor in communication with at least a portion of the optical setup and the memory. When the processor executes the instructions, the processor is configured to cause the apparatus to obtain a microscopy image of an object based on optical signal from the object in response to a first incoming optical beam; and obtain a contrast-enhancing image based on optical signal from the object in response to a second incoming optical beam. When the processor executes the instructions, the processor is configured to further cause the apparatus to generate a patterned mask based on the contrast-enhancing image; and apply the patterned mask on the microscopy image to obtain a patterned microscopy image.

The present disclosure also describes a non-transitory computer readable storage medium storing instructions. The instructions, when executed by a processor, cause the processor to perform obtaining a microscopy image of an object based on optical signal from the object in response to a first incoming optical beam; and obtaining a contrast-enhancing image based on optical signal from the object in response to a second incoming optical beam. The instructions, when executed by the processor, cause the processor to also perform generating a patterned mask based on the contrast-enhancing image. The instructions, when executed by the processor, cause the processor to further perform applying the patterned mask on the microscopy image to obtain a patterned microscopy image.

DETAILED DESCRIPTION OF THE DRAWINGS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
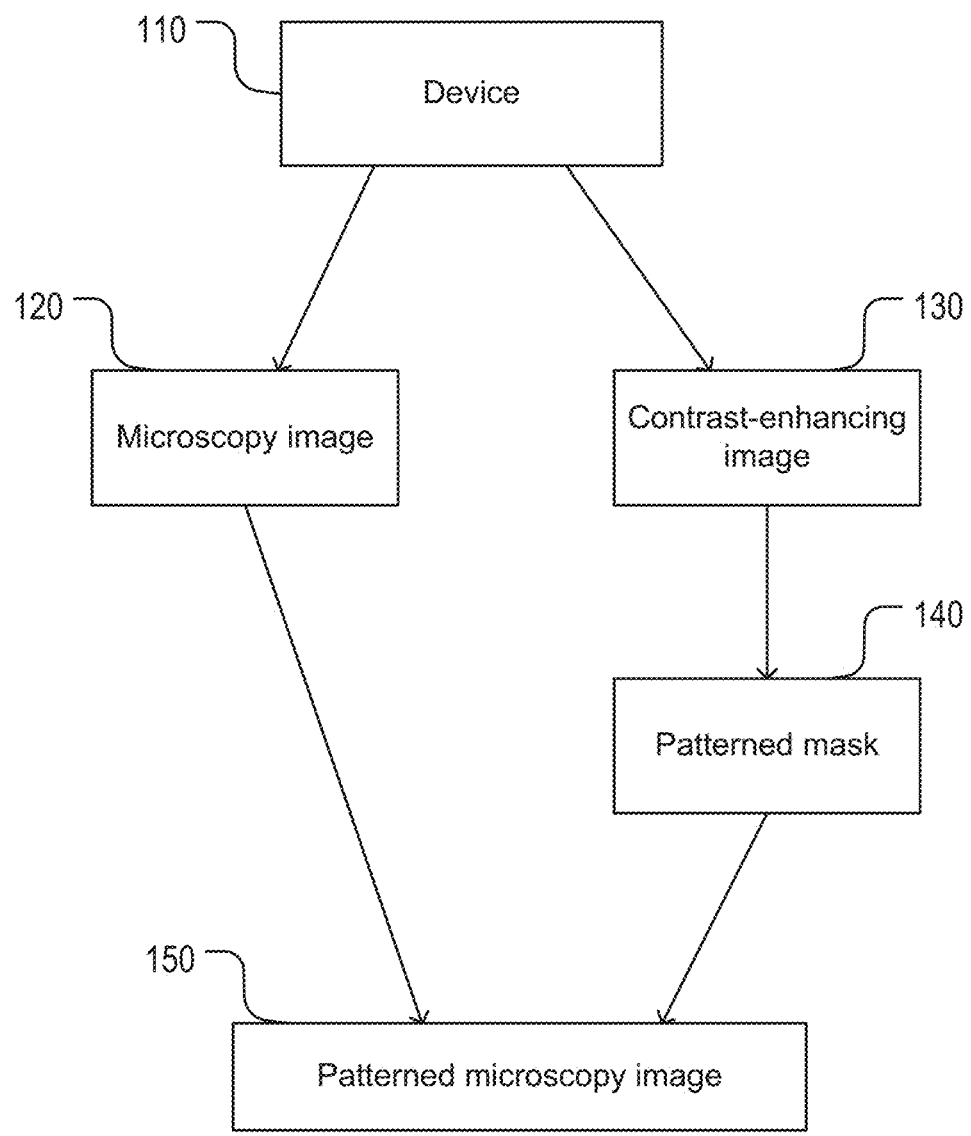
FIG. 1 shows a schematic diagram of a method and device for obtaining patterned microscopy image to enhance contrast.

FIG. 1 shows a schematic diagram of a method and device for obtaining patterned microscopy image to enhance contrast. The method may include a device 110, which is configured to generate a microscopy image 120 and a contrast-enhancing image 130. The method may include obtaining a patterned mask 140 based on the contrast-enhancing image 130, and then generating a patterned microscopy image 150 based on the microscopy image 120 and the patterned mask 140.

Referring to FIG. 1, the microscopy image 120 may include at least one of a bright-field microscopy image, a phase-contrast microscopy image, a differential-interference-contrast (DIC) microscopy image, a dark-field microscopy image, a Hoffman-modulation-contrast (HMC) microscopy image, or a polarized-light microscopy image. In another implementation, the microscopy image 120 may include a confocal microscopy image, including but not limited to, a polarimetric confocal microscopy (PLM) image. In another implementation, the microscopy image 120 may include a super-resolution microscopy image, including but not limited to, a stimulated emission depletion (STED) microscopy image, a stochastic optical reconstruction microscopy (STORM) image, and a photo activated localization microscopy (PALM) image.

Referring to FIG. 1, the contrast-enhancing image 130 may also be a specificity-enhancing image, which may have a higher sensitivity to a set of biological molecules under various environments and have a lower sensitivity to other molecules or the set of biological molecules under different environments. The contrast-enhancing image 130 may have a same resolution as the microscopy image 120.

In one implementation, the contrast-enhancing image 130 may be an optical frequency generation-based microscopy image. The optical frequency generation-based microscopy may utilize frequency generation processes for imaging samples. The optical frequency generation-based microscopy may include but not limited to, second-harmonic generation microscopy (SHG), third-harmonic generation (THG) microscopy, sum-frequency generation microscopy, and difference-frequency generation microscopy. The SHG microscopy may have high specificity to the non-centrosymmetric structure of biological molecules, for example, collagen. The SHG microscopy may also be used with its optical sectioning and label-free capabilities. The THG microscopy may be performed based on a degenerate four-wave mixing process that is sensitive to structural inhomogeneities, such as lipid bodies in cells and tissues, neurons, blood vessels and white blood cells.

In another implementation, the contrast-enhancing image 130 may be a spectroscopy-based microscopy image. The spectroscopy-based microscopy may include but not limited to, stimulated Raman spectroscopy (SRS) microscopy and coherent Raman scattering (CSRS and CARS) microscopy. The spectroscopy-based microscopy may involve three-wave (SRS) or four-wave (CSRS, CARS) mixing, and may have high sensitivity to molecular vibrational or rotational signatures in cells, tissues and whole organisms, for example, stratum corneum in skin (for SRS), spinal tissue and live-cell imaging.

In another implementation, the contrast-enhancing image 130 may be an optical coherence tomography (OCT) image. The OCT may use coherence gating for imaging samples, and may use either time-domain, frequency-domain or swept-source approaches, for example, applicable in ophthalmology, coronary, and gastrointestinal imaging.

Referring to FIG. 1, the patterned mask 140 may be generated based on the contrast-enhancing image 130. In one implementation, the patterned mask 140 may be a binary mask and may have the same resolution as the contrast-enhancing image 130. Each pixel of the patterned mask 140 may have a value of either "0" or "1". When a pixel value of a pixel of the contrast-enhancing image 130 is larger than a threshold, a pixel value of the corresponding pixel of the patterned mask 140 may be determined to be "1"; and when a pixel value of a pixel of the contrast-enhancing image 130 is smaller than the threshold, a pixel value of the corresponding pixel of the patterned mask 140 may be determined to be "0". When a pixel value of a pixel of the contrast-enhancing image 130 equals to the threshold, a pixel value of the corresponding pixel of the patterned mask 140 may be determined to be "1". In another implementation, when a pixel value of a pixel of the contrast-enhancing image 130 equals to the threshold, a pixel value of the corresponding pixel of the patterned mask 140 may be determined to be "0". In another implementation, the patterned mask 140 may be a continuous mask wherein each pixel may have a continuous value.

The threshold for generating a patterned mask 140 based on a contrast-enhancing image 130 may be determined based on a maximum intensity and a signal-to-noise ratio (SNR) of the contrast-enhancing image 130. In one implementation, a threshold may be determined as a certain percentage of the maximum intensity. The certain percentage may be within a range of 10%-40%, inclusive. The certain percentage may depend on the SNR of the contrast-enhancing image 130. In one implementation, the larger the SNR, the smaller the certain percentage is; and the smaller the SNR, the larger the certain percentage is.

For one example, when SNR equals to 10, 20% may be set for the certain percentage. When the maximum intensity of a contrast-enhancing image 130 equals to 200, the threshold for the contrast-enhancing image 130 may be determined as a product of the certain percentage (20%) and the maximum intensity (200), i.e., 20%*200=40.

For another example, when the SNR is smaller, for example SNR=5, a larger percentage may be set for the certain percentage, for example 30%. When the maximum intensity of a contrast-enhancing image 130 equals to 200, the threshold for the contrast-enhancing image 130 may be determined as (30%*200)=60.

In one implementation, the threshold may be a threshold for a whole sample or a portion of the sample. For a plurality of contrast-enhancing images for the whole sample or the portion of the sample, the overall maximum intensity and an overall signal-to-noise ratio (SNR) may be obtained, and then the threshold may be determined.

In another implementation, a first threshold may be determined for a first contrast-enhancing image for a sample, and a second threshold may be determined for a second contract-enhancing image for the same sample, for example at different z slice.

Referring to FIG. 1, the patterned microscopy image 150 may be generated based on the microscopy image 120 and the patterned mask 140. In one implementation, the microscopy image 120 and the patterned mask 140 may have the same resolution. A pixel value of each pixel of the patterned microscopy image 150 may be generated by a product of a pixel value of the corresponding pixel of the microscopy image 120 and a pixel value of the corresponding pixel of the patterned mask 140. The patterned mask 140 may be a binary mask and be determined by a chosen threshold. When a pixel value of a pixel of the contrast-enhancing image is below the chosen threshold, a contributing signal from the microscopy image is negligible (or non-existent).

Second-Harmonic Generation Microscopy and Polarization-Analyzed Reflection Confocal Microscopy Second-harmonic generation microscopy may have high specificity to the non-centrosymmetric structure of collagen, and the technique's optical sectioning and label-free capabilities. Therefore, second-harmonic generation (SHG) microscopy may be a prevalent fibrillar collagen-imaging modality, on which quantitative techniques may be applied. For one example, a quantitative approach employed on SHG may be the forward-to-backward (FB) SHG measurement, which may be used as a potential marker for tendon hydration levels. For another example, Fourier-transform (FT-) SHG may be used to quantify two-dimensional and three-dimensional collagen fiber spatial organization in tendon.

Polarized light microscopy (PLM) may leverage the birefringent properties of collagen to increase image contrast, and measure fibril orientation and parallelism. The polarized light microscopy may quantify the polarization properties of light scattered from tissues as a means to assess collagen. For example, quantitative PLM may be used to measure collagen anisotropy in sheep tendon. The previously existing PLM may be limited to two-dimensional analysis.

Another group of polarization-based approaches for characterizing collagen may invoke the derivation of the second-order polarization susceptibility (d or $\chi^{(2)}$) via its relation to the measured SHG intensity. For one example, this approach may be employed in revealing significant differences in the susceptibility matrix elements between human melanoma tumor and comparable normal mouse skin tissue, and for mapping anisotropy information in collagen-muscle junction of chicken wing. For another example, the normalized $\chi^{(2)}$ matrix elements may be used to infer molecular differences in breast biopsy collagen samples. One drawback of the previous existing method may be the need to assume a model crystallographic arrangement, and may subsequently fit the measured SHG signal data to this model.

A comprehensive polarization-based approach may entail the use of Mueller matrix polarimetry. This technique may invoke the rich and comprehensive Mueller matrix framework for characterization of acquired tissue images. The Mueller matrices may be decomposed to extract parameters that are representative of the polarization properties of the sample. For example, one decomposition method may be the Lu-Chipman Mueller matrix polar decomposition (MMPD). The MMPD, which assumes multiplicative polarization effects in optical systems, may be applied to describe the polarization response of fibrillar collagen and to identify differentiating features between healthy tissues and cancerous human basal cell carcinoma. For another example, an adaptation of Mueller matrix polarimetry may be applied to SHG microscopy for assessment of collagenous porcine tissue. Using this adaptation, based on a generalized Stokes-Mueller formalism and particular to two-photon processes, a bimodal mean difference metric ($\mu_d$)—associated with the degree of polarization—may be derived, which may show increasing variation in porcine tissue with sample thickness. A limitation of this second-order Mueller matrix theory may be that the parameters are not as intuitive as the conventional polarimetry case, which is important for understanding the underlying tissue properties.

Mueller matrix polarimetry may be carried out using several image acquisition options, including but not limited to, bright-field microscopy, optical coherence tomography (OCT), and laser scanning reflectance confocal microscopy. For example, polarimetry on OCT may be part of the broader polarization-sensitive OCT (PS-OCT) family that may be used to monitor birefringence due to thermal damage in porcine tendon, quantify birefringent properties of skin and assess coronary plaque collagen content. For another example, second-harmonic generation may be combined for imaging collagen in skin samples from salmon. PS-OCT may have the advantage of three-dimensional sectioning and deep penetration due to the coherence-gating effect and near-IR wavelengths typically used, respectively. In comparison to confocal imaging and SHG microscopy, PS-OCT may not achieve submicron resolution. In addition, PS-OCT's specificity to collagen may not be as high as SHG microscopy.

Laser scanning reflectance confocal microscopy may present an attractive polarimetric image acquisition option for several reasons. First, it may enable three-dimensional optical sectioning. Furthermore, it may be readily used for microscopy of unstained tissue samples. Mueller matrix polarimetry may be combined with a confocal imaging system to obtain three-dimensional polarization information for collagenous tissues. A drawback of previous existing method may include that confocal microscopy has no inherent imaging specificity to collagen, and hence, any subsequent analysis based on acquired images may not discriminate between collagenous and non-collagenous regions. The present disclosure describes a method for specifying collagen-rich regions with a complementary technique, so as to accurately target and characterize the collagen response in tissue samples.

The present disclosure describes an embodiment of a second-harmonic patterned polarization-analyzed reflection confocal (SPPARC) microscope, which may provide both SHG and linear polarimetric confocal microscopy images at a target imaging plane in a volume of a sample. The SPPARC microscopy may obtain spatially dependent polarization information in three dimensions, from both collagen fibers in tissue and the surrounding EFMC. The SPPARC microscopy may combine the advantage of collagen-specificity from SHG microscopy with the potential insight acquired from linear polarimetry in reflection confocal microscopy. Moreover, the SPPARC microscopy may retain the optical sectioning capability of both techniques. For example, in the SPPARC microscopy, the SHG images may be used as an endogenous mask to pattern the confocal images, and the resulting collagen-filtered confocal images may undergo MMPD analysis for extraction of traditional, linear polarimetric measures, namely, depolarization, retardance and diattenuation matrices, along with their associated scalars. In addition, the non-collagenous regions comprising the EFMC may also be obtained from the SPPARC images, and analyzed. The present disclosure describes a single microscopy platform for providing label-free, quantitative information of both the collagen fibers comprising the ECM and the EFMC environment around the fibers.

In the below disclosure, the present disclosure describes several embodiments including a polarization-analyzed reflection confocal microscopy image as a microscopy image 120 and/or a second-harmonic generation microscopy image as a contrast-enhancing image 130. The present disclosure is not limited to the below embodiments, the microscopy image 120 is not limited to a polarization-analyzed reflection confocal microscopy image, and the contrast-enhancing image 130 is not limited to a second-harmonic generation microscopy image.

Patterned Polarization-Analyzed Reflection Confocal Microscopy

Figure 2:
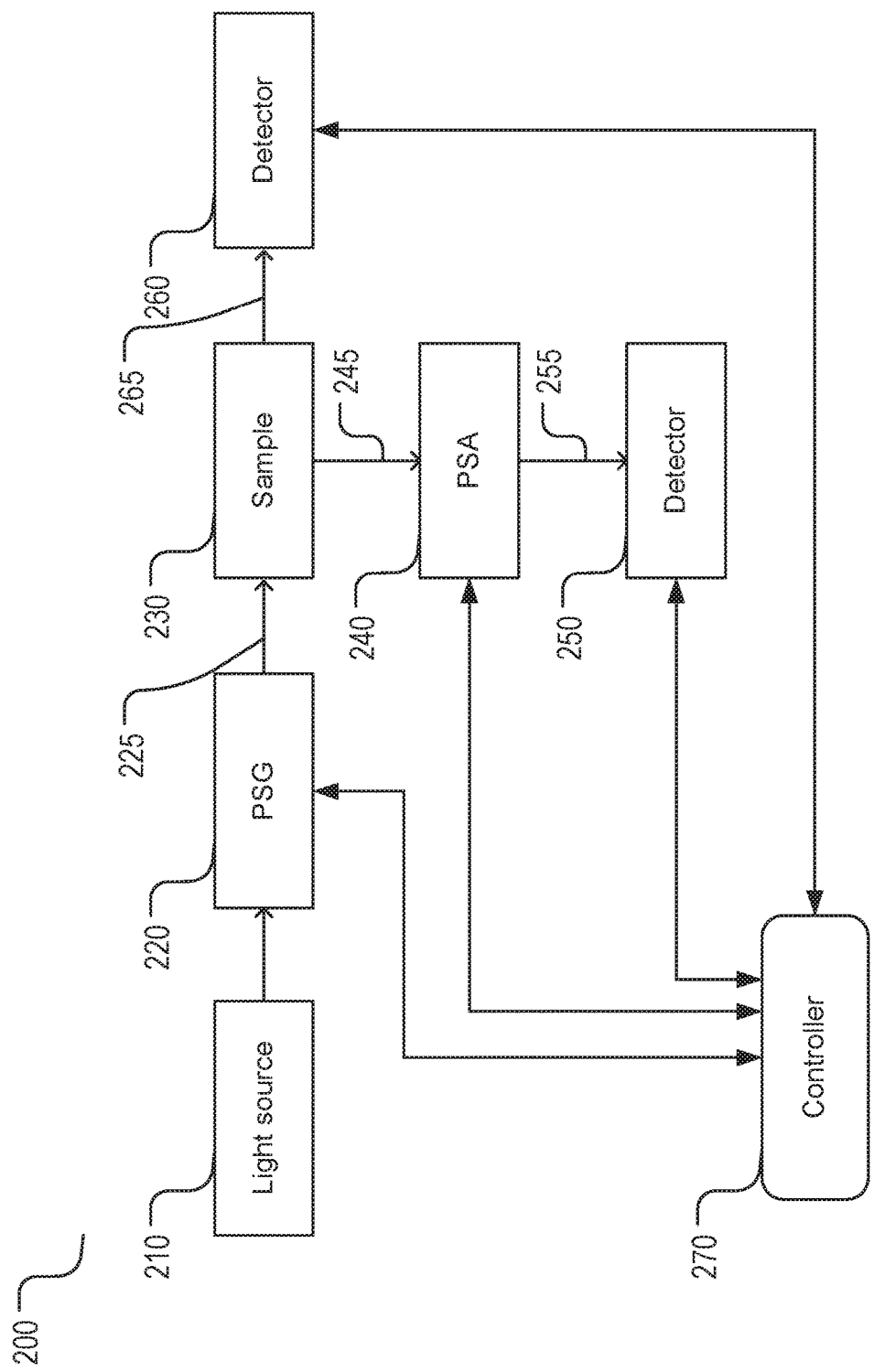
FIG. 2 shows a schematic diagram of an embodiment for obtaining a patterned microscopy image based on a polarization-analyzed reflection confocal microscopy image.

Referring to FIG. 2, the present disclosure describes an embodiment including a system 200 for obtaining a patterned microscopy image based on a polarization-analyzed reflection confocal (PARC) microscopy image. The system 200 may include a light source 210, a polarization state generator (PSG) 220, a sample 230, a polarization state analyzer (PSA) 240, and a first detector 250. Optionally, the system 200 may further include a controller 270, which is in communication with the PSG 220 and the first detector 250.

The light source 210 may be arc lamps, light emitting diodes (LEDs), or laser sources. The light source 210 may operate in either a pulsed mode or a continuous wave (CW) mode. The light source 210 may produce one or more optical beams to interact with the sample 230 at different time points or simultaneously. The one or more optical beams may propagate in free space, optical fibers, or a combination of free space and optical fibers. The one or more optical beams may be further processed by one or more optical components, for example but not limited to, mirrors, lenses, prism, and objectives of confocal microscope. The one or more optical beams may focus onto a particular region of the sample, for example, by a microscope objective. The produced one or more optical beams may scan across different regions of the sample 230 so that the produced a 2-D image. The light source 210 may be optional in the system 200, and may be supplied by an external source.

Referring to FIG. 2, the polarization state generator 220 may receive the optical beam from the light source 210 and output an optical beam with a particular polarization state. Optionally, the polarization state generator 220 may be controlled by the controller 270, and in response to the instructions received from the controller, the polarization state generator 220 may change the polarization state of the output beam. The polarization state of the output beam may include at least one or a combination of a negative 45 degree linear polarization state (−45°), a vertical linear polarization state (0°), a positive 45 degree linear polarization state (45°), a horizontal linear polarization state (90°), a right hand circular polarization state (RHC), and a left hand circular polarization state (LHC).

Referring to FIG. 2, the sample 230 may be a biological sample with a certain thickness. The sample 230 may include one or more layer of cells or tissues. The optical beam from the PSG 220 may be focused on the surface or inside of the sample 230. The optical beam from the PSG 220 may be scanned across a certain area of the sample. In one implementation, the scanning of the optical beam relative to the sample may be achieved by a movable optical component between the PSG 220 and the sample 230, for example, a galvo scanner. In another implementation, the scanning of the optical beam relative to the sample may be achieved by a movable sample stage, for example, a piezo sample stage where the sample is fixed on.

The sample 230 may move in z-direction relative to the optical beam, i.e., along the optical beam propagation direction, so that the focused optical beam may interact with portions of the sample at different z.

Referring to FIG. 2, the polarization state analyzer 240 receive scattered or reflected optical signal from the sample 230, and the first detector 250 may detect the optical signal after passing through the polarization state analyzer. Together, the polarization state analyzer 240 and the first detector 250 may measure/analyze the polarization state of the optical signal. The optical signal may be focused through a pinhole before the first detector. The pinhole may have a certain diameter, for example, 50 micrometer, and may be disposed at a conjugate plan to obtain polarimetric confocal images. The polarization state analyzer 240 may detector a plurality of polarization state of the optical signal, including but not limited to, −45°, 0°, 45°, 90°, RHC, and LHC. The optical detector 140 may include one or more of the following devices, for example, a single-photon detector, a photodiode, an avalanche photodiode (APD), a photomultiplier tube (PMT), a spectrometer, a charge-coupled device (CCD) sensor, or a complementary metal-oxide semiconductor (CMOS) sensors. The first detector 250 may further include one or more optical filters to select and detect optical photons with a certain energy. For example but not limited to, the one or more optical filters may include a long pass filter, a short pass filter, a band pass filter, a monochromatic filter, and a dichroic filter. The first optical detector 250 may be optional in the system 200.

In one implementation, when the optical signal is reflected from the sample, the optical path 245 between the sample 230 and the PSA 240 may share a portion of the optical path 225 between the PSG 220 and the sample 230.

Referring to FIG. 2, the system 200 may further include the second detector 260 to detect optical signals from the sample. The second detector 260 may be a same or different optical detector as the first detector 250. The second detector 260 may include other optical components, including but not limited to, a long pass filter, a short pass filter, a band pass filter, a monochromatic filter, and a dichroic filter. The second detector 260 may be in communication with the controller 270, so that the second detector 260 may send the measured data of optical signal from the sample to the controller 270, generating a second microscopy image. The second microscopy image may be a contrast-enhancing image. The optical path 265 between the sample 230 and the second detector 260 may share a portion of the optical path 225 between the PSG 220 and the sample 230; and/or the optical path 265 may also share a portion of the optical path (245 and 255) between the sample 230 and the first detector 250.

In one implementation, the second detector 260 may include one or more optical filters to select and detect optical photons with a certain energy or a certain optical frequency. For example, there may be a short pass filter and/or a band pass filter in front of the second detector 260, so that only the second harmonic generated optical signal may be detected by the second detector 260. The second detector 260 may measure the second harmonic generated optical signal and send the measured data to the controller 270, so that the controller may generate a second harmonic generation microscopy image.

The controller 270 may communicate with the PSG 220, the PSA 240, the first detector 250, and/or the second detector 260. The controller 270 may be any form of mobile or fixed electronic devices including but not limited to desktop personal computer, laptop computers, tablets, mobile phones, personal digital assistants, and the like. The controller 270 may be installed with a user interface for interacting with an operator. The controller 270 may include communication interfaces, a processor, input/output (I/O) interfaces, storages, and display circuitry. The controller 270 may communicate with all other components of the system to send/receive commands, data, or the like. The controller 270 may be optional in the system 200.

The controller 270 may send instructions to the PSG 220, the PSA 240, the first detector 250, and the second detector 260. The controller 270 may receive measured data of first optical signal from the sample from the first detector 250, so that the controller 270 may generate a polarimetric confocal image. The controller 270 may also receive measured data of second optical signal from the sample from the second detector 260, so that the controller 270 may generate a contrast-enhancing image.

In one implementation, the controller 270 may generate a patterned mask based on the contrast-enhancing image, and may generate a patterned polarimetric confocal image based on the polarimetric confocal image and the patterned mask. In another implementation, the controller 270 may save the contrast-enhancing image and the polarimetric confocal image and process at a later time point; or the controller 270 may send the contrast-enhancing image and the polarimetric confocal image to a second electronic device, so that the second electronic device may generate the patterned polarimetric confocal image.

Figure 11:
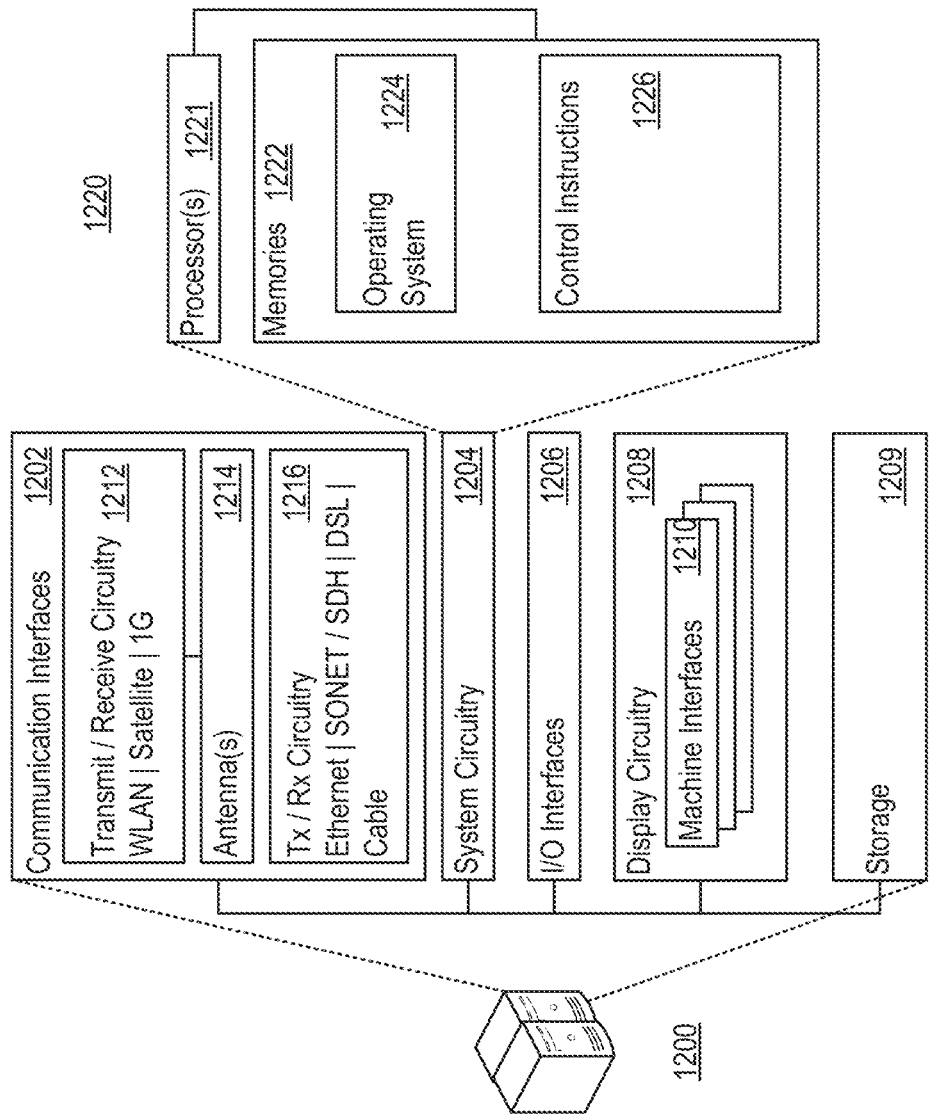
FIG. 11 illustrates computer systems that may be used to implement the controller in FIG. 2.

Referring to FIG. 11, in one implementation, a computer system 1200 may be used as the controller 270 in FIG. 2.

The computer system 1200 may include communication interfaces 1202, system circuitry 1204, input/output (I/O) interfaces 1206, storage 1209, and display circuitry 1208 that generates machine interfaces 1210 locally or for remote display, e.g., in a web browser running on a local or remote machine. The machine interfaces 1210 and the I/O interfaces 1206 may include GUIs, touch sensitive displays, voice or facial recognition inputs, buttons, switches, speakers and other user interface elements.

The machine interfaces 1210 and the I/O interfaces 1206 may further include communication interfaces with the PSG, the PSA, the first detector, and/or the second detector. The communication between the computer system 1200 and the PSG, the PSA, the first detector, and/or the second detector may include wired communication or wireless communication. The communication may include but not limited to, a serial communication, a parallel communication; an Ethernet communication, a USB communication, and a general purpose interface bus (GPIB) communication.

Additional examples of the I/O interfaces 1206 include microphones, video and still image cameras, headset and microphone input/output jacks, Universal Serial Bus (USB) connectors, memory card slots, and other types of inputs. The I/O interfaces 1206 may further include magnetic or optical media interfaces (e.g., a CDROM or DVD drive), serial and parallel bus interfaces, and keyboard and mouse interfaces.

The communication interfaces 1202 may include wireless transmitters and receivers ("transceivers") 1212 and any antennas 1214 used by the transmitting and receiving circuitry of the transceivers 1212. The transceivers 1212 and antennas 1214 may support Wi-Fi network communications, for instance, under any version of IEEE 802.11, e.g., 802.11n or 802.11ac. The communication interfaces 1202 may also include wireline transceivers 1216. The wireline transceivers 1216 may provide physical layer interfaces for any of a wide range of communication protocols, such as any type of Ethernet, data over cable service interface specification (DOCSIS), digital subscriber line (DSL), Synchronous Optical Network (SONET), or other protocol. In another implementation, the communication interfaces 1202 may further include communication interfaces with the PSG, the PSA, the first detector, and/or the second detector.

The storage 1209 may be used to store various initial, intermediate, or final data. In one implementation, the storage 1209 of the computer system 1200 may be integral with a database server. The storage 1209 may be centralized or distributed, and may be local or remote to the computer system 1200. For example, the storage 1209 may be hosted remotely by a cloud computing service provider.

The system circuitry 1204 may include hardware, software, firmware, or other circuitry in any combination. The system circuitry 1204 may be implemented, for example, with one or more systems on a chip (SoC), application specific integrated circuits (ASIC), microprocessors, discrete analog and digital circuits, and other circuitry.

For example, the system circuitry 1204 may be implemented as 1220 for the controller 270 of FIG. 2. The system circuitry 1220 of the controller may include one or more instruction processors 1221 and memories 1222. The memories 1222 stores, for example, control instructions 1226 and an operating system 1224. The control instructions 1226, for example may include instructions for generating a patterned mask or for controlling PSA. In one implementation, the instruction processors 1221 execute the control instructions 1226 and the operating system 1224 to carry out any desired functionality related to the controller.

Polarization-Analyzed Reflection Confocal Microscopy

Figure 3:
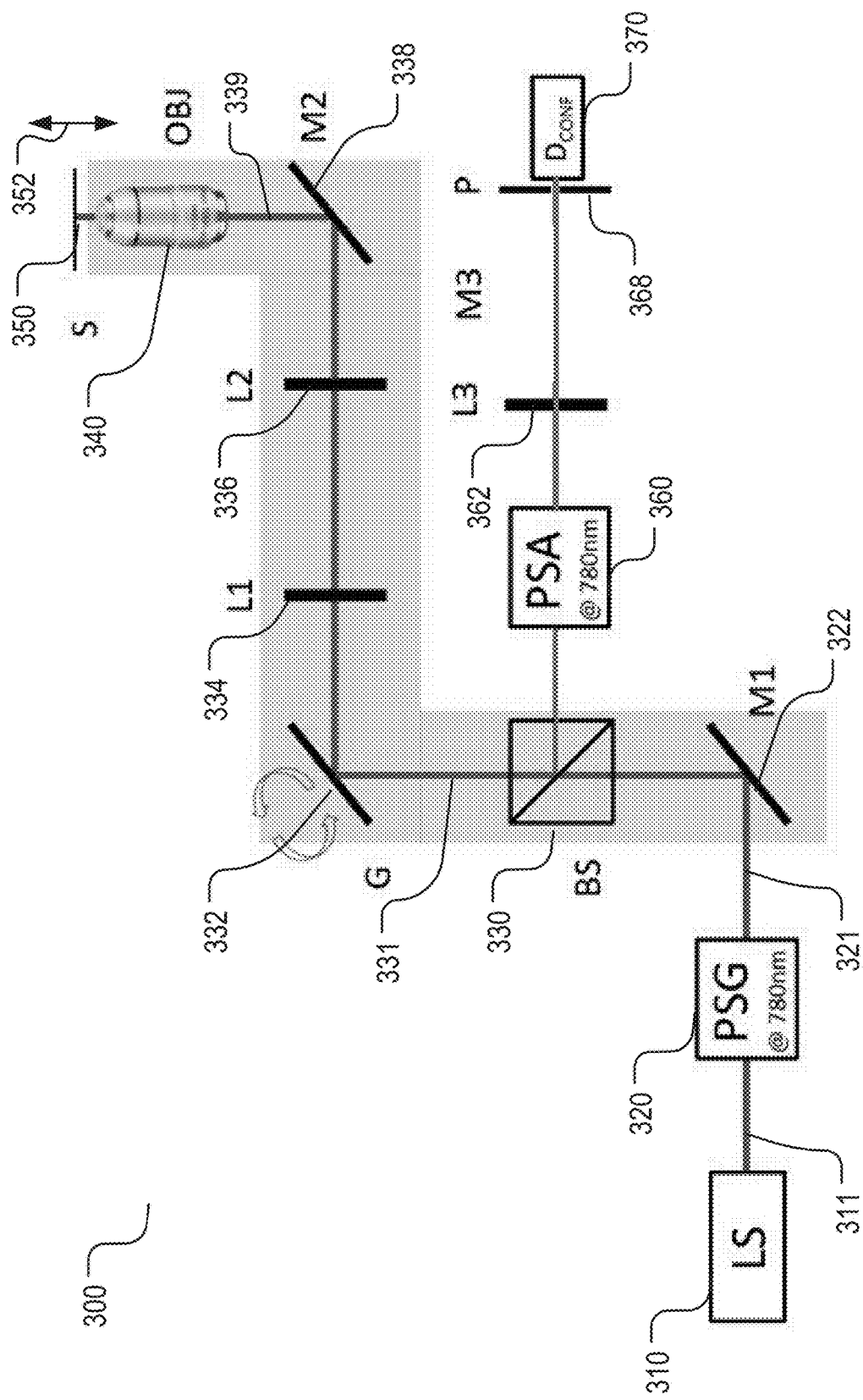
FIG. 3 shows a schematic diagram of another embodiment for obtaining a polarization-analyzed reflection confocal microscopy image.

Referring to FIG. 3, the present disclosure describes an embodiment of a system 300 for obtaining a polarization-analyzed reflection confocal microscopy image. The system 300 may include a plurality of optical components, including a light source 310, a PSG 320, a beam splitter (BS) 330, a focusing lens 340, a sample 350, a PSA 360, and a detector 370. The system 300 may further include a plurality of optical components, for example, one or more lens (334, 336, and 362), one or more mirrors (322 and 338), a galvo mirror 332, and/or a pinhole 368.

The light source 310 may include a laser, for example, a Ti:Sapphire laser system producing an optical beam 311 including 100 femtosecond (fs) duration pulses spectrally centered at 780 nanometer (nm). The polarization state of the optical beam may be set using a polarization state generator (PSG) 320, for example, the PSG may be spectrally centered at 780 nm.

The optical beam 331 output from the PSG may be directed by a mirror 322 through a beam splitter 330, for example, a cube beam-splitter with a split ratio of (30:70).

The transmitted optical beam 331 from the beam splitter 330 may be subsequently relayed by a galvo scanner 332 and other optical components to the focusing lens 340. The other optical components may optionally include a set of collimating lens (334 and 336) and a mirror 338.

The focusing lens 340 may include a microscope objective, and the focusing lens 340 may focus the optical beam 339 onto the sample. In one implementation, the focusing lens may include a strain-free objective with a numerical aperture (NA) of 0.65 and magnification of 40×. This relatively lower numerical aperture and strain-free objective may allow the focusing behavior to be satisfied within scalar diffraction theory, and to minimize unwanted polarization scattering effects.

The galvo mirror 332 may include one or more scanning galvo mirror, which is configured to sweep the optical beam 331 across two dimensions (e.g., x-direction and y-direction). In one implementation, the optical beam may be swept across about 200-µm field-of-view on the sample. Here, the term "about" a value may refer to a range of ±10% of the value.

The sample 350 may include an object and a sample stage. The focus of the optical beam through the focusing lens 340 may move relatively along z-direction 352 of the sample, so that the focus of the optical beam may interact with different portion of the sample at different z-position. In one implementation, the focusing lens 340 may move along z-direction 352, and the sample and the sample stage may be stationary. In another implementation, the sample and the sample stage may move along z-direction, and the focusing lens 340 may be stationary.

In response to the optical beam focused on the sample, the sample 350 may generate optical signal. The optical signal may include epi-scattered signal, and may be collected by the same focusing lens 340 and propagate back via the mirror 338, the set of collimating lens (334 and 336), the galvo mirror 332.

A portion of the optical signal may be reflected by the beam splitter 330 towards the PSA 360. The optical signal from the PSA 360 may be focused by a lens 362, pass through the pinhole 368 at the conjugate plane, and then be measured by a detector 370. The pinhole 368 may include a 50-µm diameter pinhole. The conjugate plane may be a plane conjugate to the focal plane of the optical beam on the sample. The pinhole 368 may block most of the optical signal from out-of-focus planes, and allow the optical signal from samples at in-focus plane passing through. Therefore, the detector 370 may primarily measure the optical signals generated from samples at in-focus planes.

The detector 370 may include a photomultiplier tube (PMT). When the optical beam is swept across a field-of-view on the sample, the measured data of the detector may form a 2-D image. When the optical beam is in-focus with the sample at a plurality of z-positions, a plurality of 2-D images may be obtained. A 3-D image may be constructed based on the plurality of 2-D images.

The system 300 may generate a polarization-analyzed reflection confocal microscopy image based on the polarization change of the optical beam propagating from the PSG 320 to the PSA 360. In one implementation, when the PSG generates the optical beam at one of six polarization states, the PSA may analyze the optical signal each of the six polarization states and a first set of six 2-D polarimetric confocal images may be generated. Consequently, when the PSG generates the optical beam at the other five of the six polarization states, one by one, the PSA may analyze the optical signal at the six polarization states. Thus, five sets of six 2-D polarimetric confocal images may be generated. The polarization-analyzed reflection confocal microscopy image may be generated based on all six sets of six 2-D polarimetric confocal images.

Specifically, the polarization change of the optical beam propagating from the PSG 320 to the PSA 360 includes a polarization contribution from the sample 350 (hereinafter "sample polarization contribution") and a polarization contribution from the optical setup (hereinafter "setup polarization contribution"). To isolate the sample polarization contribution, an optical setup characterization process may be performed, during which the optical setup may be fully characterized using Mueller matrix.

Figure 4A:
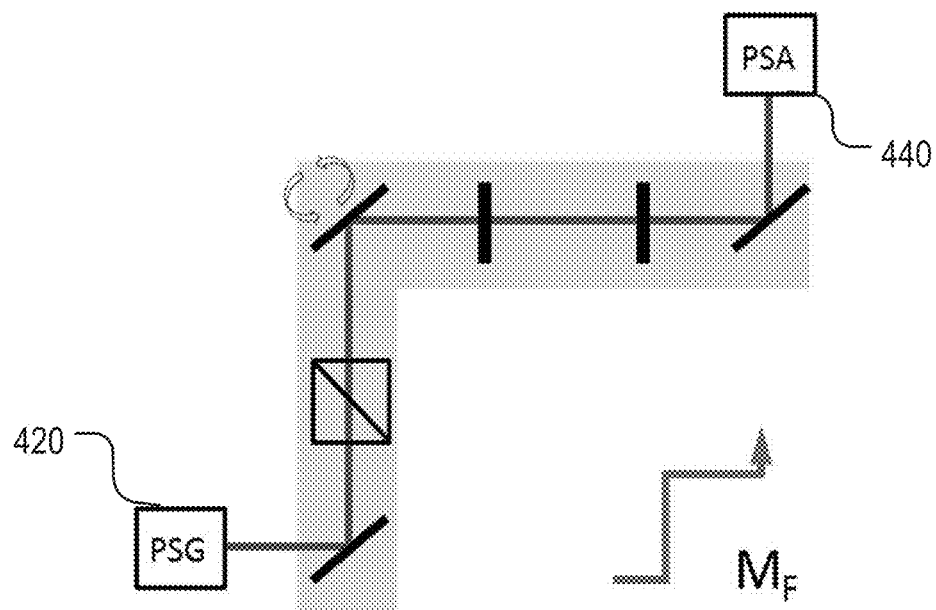
FIG. 4A shows a schematic diagram of a forward matrix.

Referring to FIG. 4A, during the optical setup characterization process, a forward matrix, for example, a Mueller matrix $M_F$, may be obtained by PSA-PSG measurements. In FIG. 4A, a PSA 440 may be disposed at a location where the focusing lens 340 in FIG. 3. A detector may be placed after the PSA 440 to detect the optical signal from the PSA 440. Therefore, the detector may detect a polarization change from the PSG 420 to the location where the PSA 440 is disposed. In one implementation, an effect of the focusing lens 340 on the polarization of the optical beam may be ignored.

In one implementation, the forward matrix may be measured and computed to be $$M_F = \begin{pmatrix} 1.000 & 0.000 & 0.000 & 0.000 \\ 0.063 & -0.704 & -0.391 & 0.592 \\ -0.083 & -0.675 & 0.644 & -0.396 \\ -0.012 & -0.052 & -0.652 & -0.624 \end{pmatrix}.$$

The method of measurement and computation is describe in the below Section "Mueller matrix calculation."

Figure 4B:
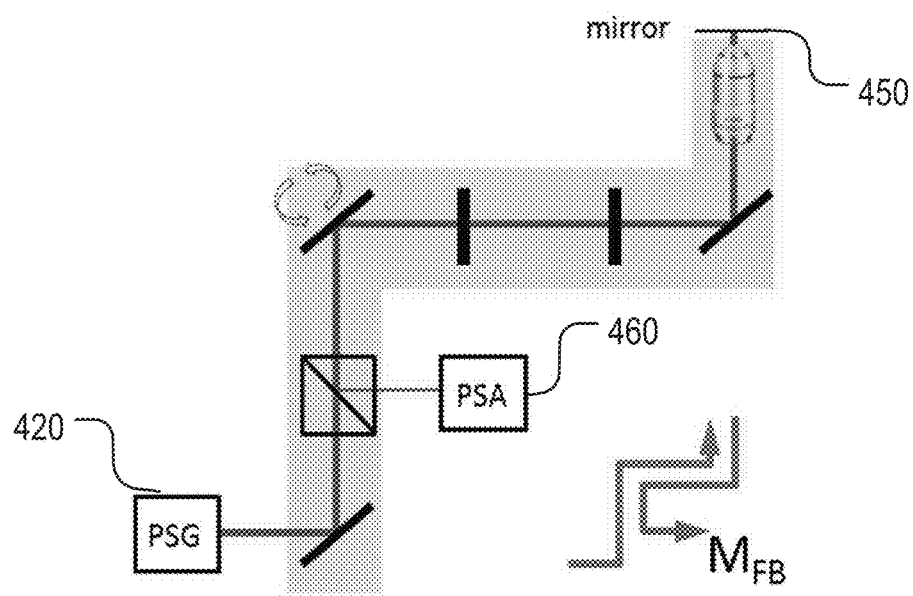
FIG. 4B shows a schematic diagram of a forward+backward matrix.

Referring to FIG. 4B, a forward+backward matrix, for example, a Mueller matrix $M_{FB}$, may be obtained by PSA-PSG measurements. In FIG. 4B, a mirror 450 may be disposed at a location where the sample 350 in FIG. 3, so that the optical beam may be directly reflected back along the same path. A detector may be placed after the PSA 460 to detect the optical signal passing through the PSA 460. Therefore, the detector may detect a combined polarization change, which includes three polarization contributions: 1) $M_F$ from the PSG 420 to the mirror 450; 2) $M_{mirror}$ referring to the reflection of the mirror 450; and 3) $M_B$ from the mirror 450 to the PSA 460. Therefore, based on algebra of Mueller matrix as described in the below Section "Mueller matrix calculation," $M_{FB}=M_B M_{mirror} M_F$.

In one implementation, the forward+backward matrix $M_{FB}$ may be measured and computed to be $$M_{FB} = \begin{pmatrix} 1.000 & 0.000 & 0.000 & 0.000 \\ -0.001 & -0.951 & -0.224 & -0.202 \\ 0.039 & 0.144 & 0.179 & -1.000 \\ 0.006 & 0.422 & -0.900 & -0.151 \end{pmatrix}.$$

The method of measurement and computation is describe in the below Section "Mueller matrix calculation."

The backward matrix, for example, a Mueller matrix $M_B$, may then be obtained from $M_B = M_{FB}(M_F)_P^{-1}(M_{mirror})_P^{-1}$, where $$M_{mirror} = \begin{pmatrix} 1 & 0 & 0 & 0 \\ 0 & 1 & 0 & 0 \\ 0 & 0 & -1 & 0 \\ 0 & 0 & 0 & -1 \end{pmatrix}$$

is the ideal mirror Mueller matrix reflecting at normal incidence.

Referring to FIG. 3, when a sample 350 is disposed at the sample position, the measured Mueller matrix $M_{measured}$ may be measured. The measured Mueller matrix $M_{measured}$ may include three portions of polarization changes: 1) $M_F$ from the PSG 320 to the sample 350; 2) $M_{sample}$ from the sample 350; and 3) $M_B$ from the sample 350 to the PSA 360. Therefore, based on the below Section "Mueller matrix calculation," $M_{measured} = M_B M_{sample} M_F$; and thus the sample matrix $M_{sample}$ can be obtained from the measured matrix $M_{measured}$ via $M_{sample} = (M_B)_P^{-1} M_{measured}(M_F)_P^{-1}$.

As discussed above, $M_F$ and $M_B$ may be measured and computed during the optical setup characterization process.

image analysis algorithm based on Equation 3, as described in the below Section "Mueller matrix calculation."

Based on the determined Mueller matrix for each pixel, a plurality of sub-matrices may be determined based on a Mueller matrix polar decomposition (MMPD) method, for example but not limited to, the Lu-Chipman MMPD method.

In one implementation, the Mueller matrix may be decomposed into three sub-matrices: the diattenuation sub-matrix $M_D$, the retardance sub-matrix $M_R$, and the depolarization sub-matrix $M_\Delta$, so that $M = M_\Delta M_R M_D$.

$$M_\Delta = \begin{pmatrix} 1 & \vec{0}^T \\ \vec{P}_\Delta & m_\Delta \end{pmatrix}, M_R = \begin{pmatrix} 1 & \vec{0}^T \\ \vec{0} & m_R \end{pmatrix}, \text{ and } M_D = \begin{pmatrix} 1 & \vec{D}^T \\ \vec{D} & m_D \end{pmatrix}$$

$m_\Delta$ may be 3×3 depolarization, retardance and diattenuation sub-matrices respectively, where $\vec{P}_\Delta$ is the polarizance vector and $\vec{D}$ is the diattenuation vector.

Based on the determined Mueller matrix and the obtained sub-matrices for each pixel, one or more scalar parameters may be determined using equations in Table 1.

TABLE 1

| Scalar metric parameter | Mathematical Definition | Description |
| --- | --- | --- |
| diattenuation | $D = \text{norm}(\vec{D})$ | Measure of the dependence of the transmittance of the system on incident polarization. Obtained from the diattenuation vector. |
| depolarization | $\Delta = 1 - \dfrac{|Tr(M_R) - 1|}{3}$ | Measure of depolarization power of the depolarizer matrix on a polarized incident source. Obtained from the depolarization matrix. |
| linear retardance | $R_L = \cos^{-1}[((m_{R11} + m_{R22})^2 + (m_{R11} + m_{R22})^2)^{1/2} - 1]$ | Degree of change in retardance for linearly polarized light. |
| linear DOP | $DOP_L = \dfrac{m_{10} + m_{11}}{m_{00} + m_{01}}$ | Degree to which linearly polarized input light preserves its polarization state. |
| circular DOP | $DOP_C = \dfrac{m_{30} + m_{33}}{m_{00} + m_{03}}$ | Degree to which circularly polarized input light preserves its polarization state. |

Therefore, the sample matrix $M_{sample}$ can be obtained based on the measured matrix $M_{measured}$, $M_F$, and $M_B$ via $M_{sample} = (M_B)_P^{-1} M_{measured}(M_F)_P^{-1}$.

Referring to FIG. 3, for any selected region of the sample 350, 36 polarimetric confocal sample images are obtained from six polarization detecting configurations of the PSA 360 for six polarization generating states of the PSG 320. Each of the 36 polarimetric confocal sample images may be a 2-D image, and the Mueller matrix $$M = \begin{pmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{pmatrix}$$

for each pixel may be determined based on all or a portion of the 36 polarimetric confocal sample images using an For a selected scalar parameter, a corresponding value for each pixel of the 2-D image may be determined based on the equations in Table 1, so as to generate a new 2-D image corresponding to the selected scalar parameter. For example, when a depolarization parameter is selected, a corresponding depolarization value for each pixel of the 2-D image may be determined based on equation $$\Delta = 1 - \frac{|Tr(M_R) - 1|}{3},$$

the determined Mueller matrix, and/or the obtained sub-matrices for each pixel. Consequently, a polarization-analyzed reflection confocal microscopy image using depolarization parameter may be generated based on the depolarization value for each pixel.

Second-Harmonic Patterned Polarization-Analyzed Reflection Confocal Microscopy

Figure 5:
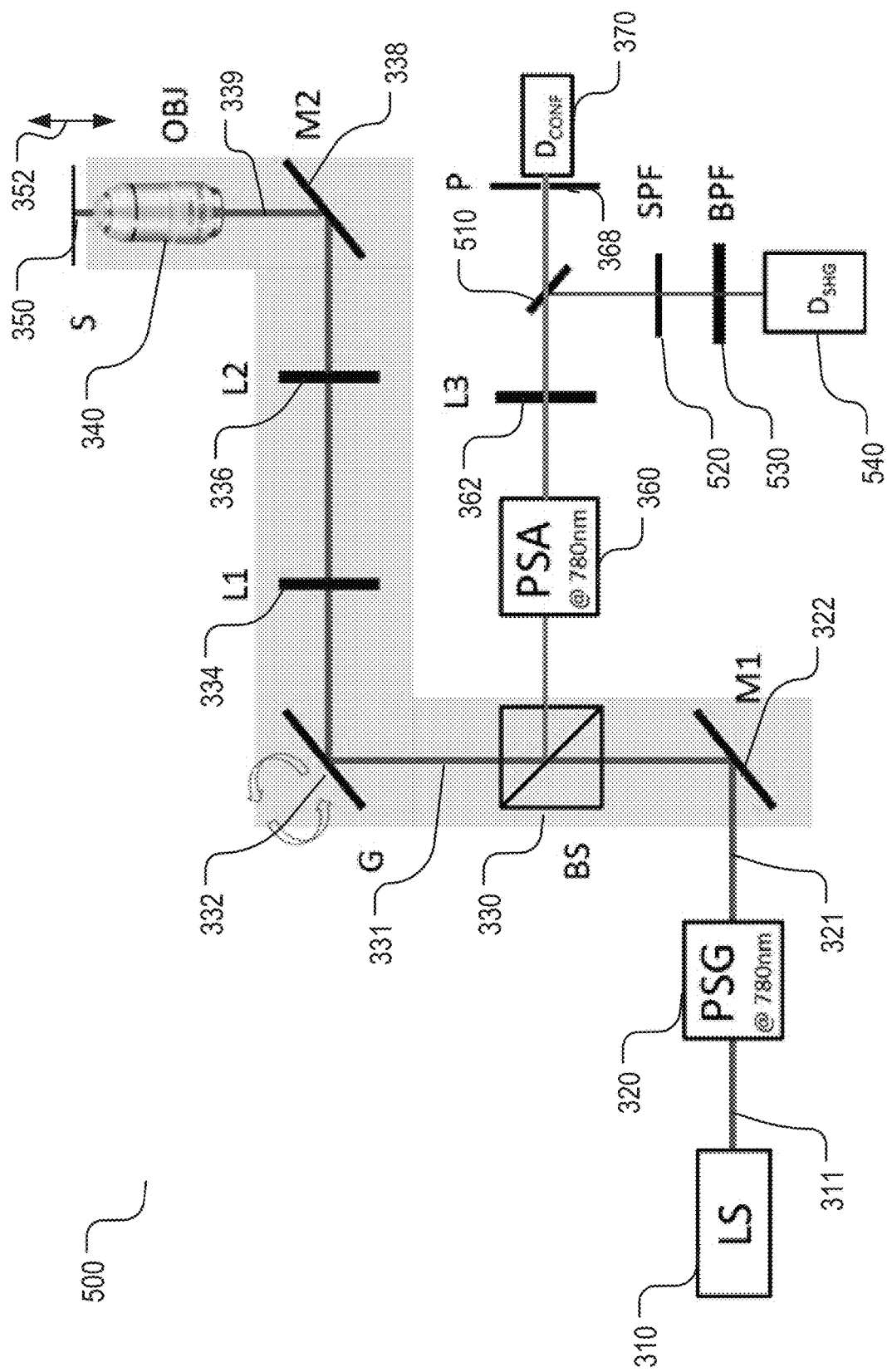
FIG. 5 shows a schematic diagram of another embodiment for performing second-harmonic patterned polarization-analyzed reflection confocal (SPPARC) microscopy.

Referring to FIG. 5, the present disclosure describes a system 500 for performing second-harmonic patterned polarization-analyzed reflection confocal (SPPARC) microscopy. The system 500 may include a few more optical components in comparison with the system 300 in FIG. 3. The system 500 may further include a movable mirror 510. The system 500 may also include a short-pass filter (SPF) 520 and/or a band-pass filter (BPF) 530. The system 500 may also include a second detector 540. In one implementation, the light source 310 may include a laser producing an optical beam of 100 femtosecond (fs) duration pulses spectrally centered at 780 nanometer (nm), and the system 500 may obtain polarization-analyzed second-harmonic generation (SHG) images at 390 nm using one polarization state of the optical beam, for example but not limited to, a right circularly polarized state of the optical beam.

In one implementation, when the system 500 performs SHG microscopy, the PSA 360 may be moved away. In another implementation, when the system 500 performs SHG microscopy, the PSA 360 may stay and be set in an "off" state, in which it does not analyze the polarization of the optical signal from the sample, instead it allows light having any polarization state passing through.

The movable mirror 510, when it is disposed in the optical path of the optical signal, deflects the optical signal propagating from the sample 350 towards the second detector 540. The movable mirror 510 may be moved away from its position in FIG. 5 so that the system 500 performs polarization-analyzed reflection confocal microscopy. The movable mirror 510 may be controlled by a controller so that its movement may be controlled automatically and/or may be coordinated with other optical components in the system 500.

FIG. 5 shows that the mirror is at 45 degree angle relative to the optical signal propagation direction. The present disclosure does not limit the angle, and the angle may be any value from 10 to 80 degrees.

In another implementation, the mirror 510 may be replaced by a beam splitter, for example, a cube beam splitter. One of the advantages with the beam splitter may be that the system 500 may perform SHG microscopy and polarization-analyzed reflection confocal microscopy without the need to move the mirror, thus improving efficiency, reliability, and speed of the system. Another of the advantages with the beam splitter may be that the system 500 may perform SHG microscopy and polarization-analyzed reflection confocal microscopy at the same time.

The short-pass filter 520 and the band-pass filter 530 may block the optical frequency at the original optical beam and/or allow the second-harmonic generated optical signal passing through, so that the second detector 540 may primarily measure the second harmonic generated optical signal. In one implementation, the short-pass filter may include a filter of Semrock FF01-680/SP-25, and the band-pass filter may include a filter of Semrock FF01-390/BP-18-25. The second detector may include a photo multiplier tube (PMT).

Referring to FIG. 5, the mirror 510 is not limited to the position shown in FIG. 5, and the mirror 530 may be disposed at various locations. In one implementation, the mirror 510 (or a replaced beam splitter) may be disposed between the PSA 360 and the lens 362. In another implementation, the mirror 510 (or a replaced beam splitter) may be disposed between the beam splitter 330 and the PSA 360.

The SHG image may be the contrast-enhancing image, and a patterned mask may be generated based on the SHG image. The pattern mask may be used as a mask on the polarization-analyzed reflection confocal microscopy image, so as to generate an SPPARC image.

Embodiments of Second-Harmonic Patterned Polarization-Analyzed Reflection Confocal Microscopy The present disclosure describes embodiments of using an apparatus for performing second-harmonic patterned polarization-analyzed reflection confocal (SPPARC) microscopy. The apparatus may include the system 500 as shown FIG. 5.

In one embodiment, a sample may include porcine tendon and posterior cruciate ligament (PCL). The porcine tendon and posterior cruciate ligament may be embedded in optimal cutting temperature compound at −25° C. The embedded tissue may be cut into thin sections using a cryostat, for example but not limited to, a Leica CM3050S, and soaked in 1× phosphate buffered saline (PBS) to remove the excess embedding compound. Next, the thin sections may be placed on glass microscope slides, and coverslips may be mounted on top with the aqueous mounting media. The coverslips may be #1.5 coverslips. Tweezers may be used to gently lower the coverslip on the microscope slide to avoid creating any air bubbles. After the sample is dried, nail polish may be applied on the corners to seal the samples.

In one embodiment, the apparatus may generate one or more polarization-analyzed reflection confocal microscopy image and a corresponding SHG image. Each image may have a resolution of 512×512 pixels. The whole process may take within about 120 seconds. A binary patterned mask may be generated by binarizing the SHG image based on a threshold.

The threshold may be determined based on second-harmonic signal strength to highlight regions with appreciable collagen. In one implementation, the threshold is determined based on the maximum intensity and signal-to-noise ratio (SNR) of the SHG image. For the sample including porcine tendon and posterior cruciate ligament, the threshold values may be determined based on 10-40% of the maximum intensity and the SNR of the SHG image. The chosen threshold is sample dependent.

In one embodiment, the binary patterned mask may be used as a mask to pattern the SPPARC images. This process may have the benefits of yielding confocal images of collagen-rich regions. Below the chosen threshold, contributing signals from collagen may be set to zero, so that they may be negligible (or non-existent).

A Mueller matrix per pixel are then determined using an image analysis algorithm based on Equation 3, and/or sub-matrices and scalar parameters are determined using equations in Table 1.

Figure 6A:
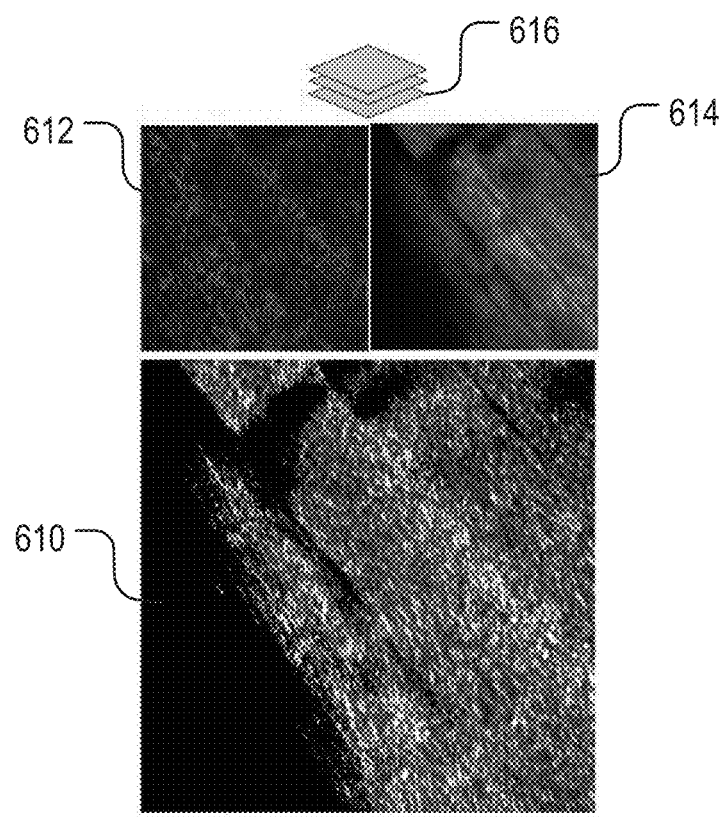
FIGS. 6A-6C show an embodiment obtaining three SPPARC images at three different z-positions for a sample.
Figure 6B:
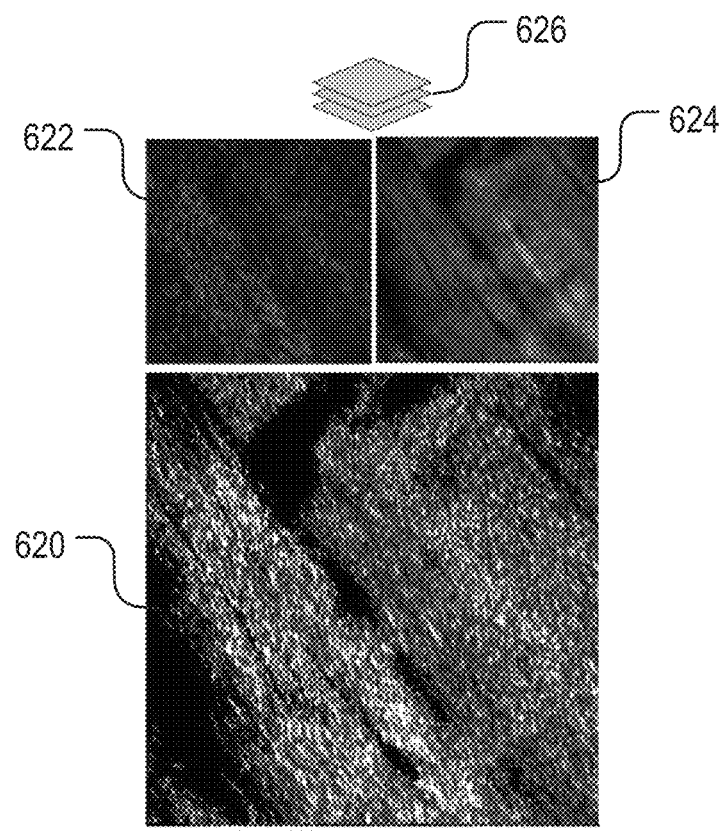
Figure 6C:
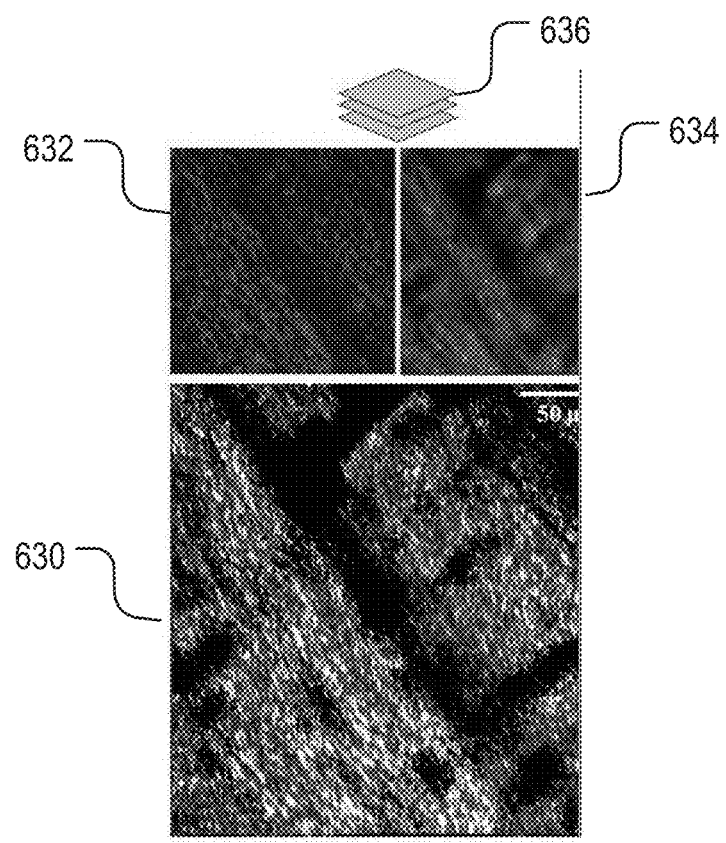

FIGS. 6A-6C show three SPPARC images at three different z-positions for the sample including porcine tendon in the embodiment. The three different z-positions may have a step size of 5 micrometer (μm).

Referring to FIG. 6A, a first SPPARC image 610 may be generated based on a polarization-analyzed reflection confocal image 612 and a SHG image 614. A layer diagram 616 shows that the first SPPARC image 610 corresponds to a slice at the lower z-position.

Referring to FIG. 6B, a second SPPARC image 620 may be generated based on a polarization-analyzed reflection confocal image 622 and a SHG image 624. A layer diagram 626 shows that the second SPPARC image 620 corresponds to a slice at the middle z-position.

Referring to FIG. 6C, a third SPPARC image 630 may be generated based on a polarization-analyzed reflection confocal image 632 and a SHG image 634. A layer diagram 636 shows that the third SPPARC image 630 corresponds to a slice at the higher z-position.

In one embodiment, an axial resolution may be determined based on theoretical considerations and the specifications of the optical components in the apparatus. For example, an axial resolution for confocal microscopy may be calculated as $1.4 \cdot n \cdot \lambda\_em1/NA^2$ ($=2.6$ μm). For another example, an axial resolution for SHG microscopy may be calculated as $2.3 \cdot n \cdot \lambda\_em2/NA^2$ ($=2.1$ μm). The emission wavelengths, $\lambda\_em1$ and $\lambda\_em2$ may be 780 nm and 390 nm respectively, and n, an index of refraction, may be the index of refraction of air. The calculated axial resolutions is less than the 5 μm layer separation, so that each slice may exclude significant out-of-plane signal contamination.

Figure 7A:
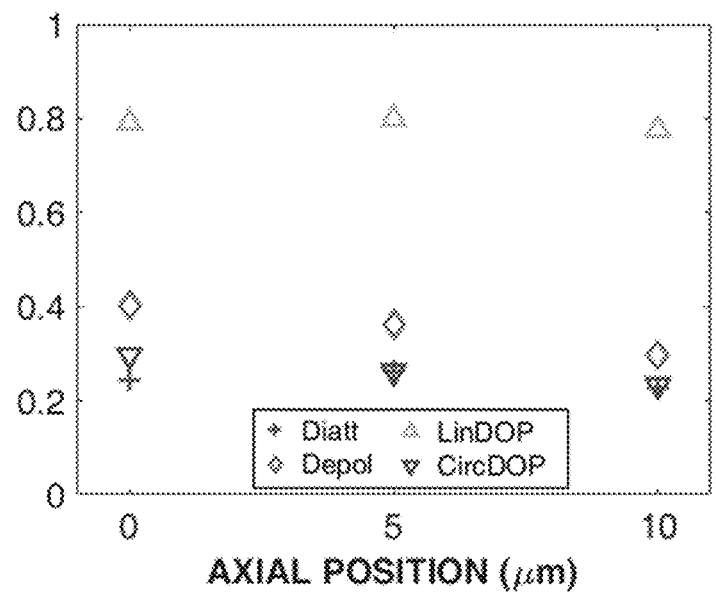
FIGS. 7A-7B show variations of scalar metric parameters across different slices at various z-positions in a sample.
Figure 7B:
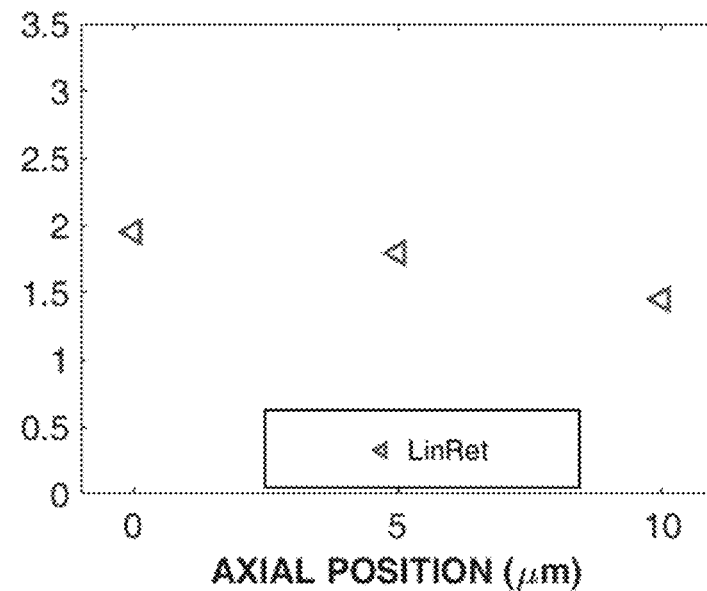

In another implementation, FIGS. 7A-7B show variations of scalar metric parameters across different slices at various z-positions in a sample, for example, the three layers imaged shown in FIGS. 6A-6C.

FIG. 7A shows that depolarization and circular DOP parameters may have a similar trend, reducing in value with deeper tissue penetration. Diattenuation and linear DOP may have minimal variation across layers. The high linear DOP values may indicate that there is a cumulative effect of preserving linear polarization, which is expected to be along the direction of the fibrils.

FIG. 7B shows that the average linear retardance may reduce with deeper penetration.

Figure 8A:
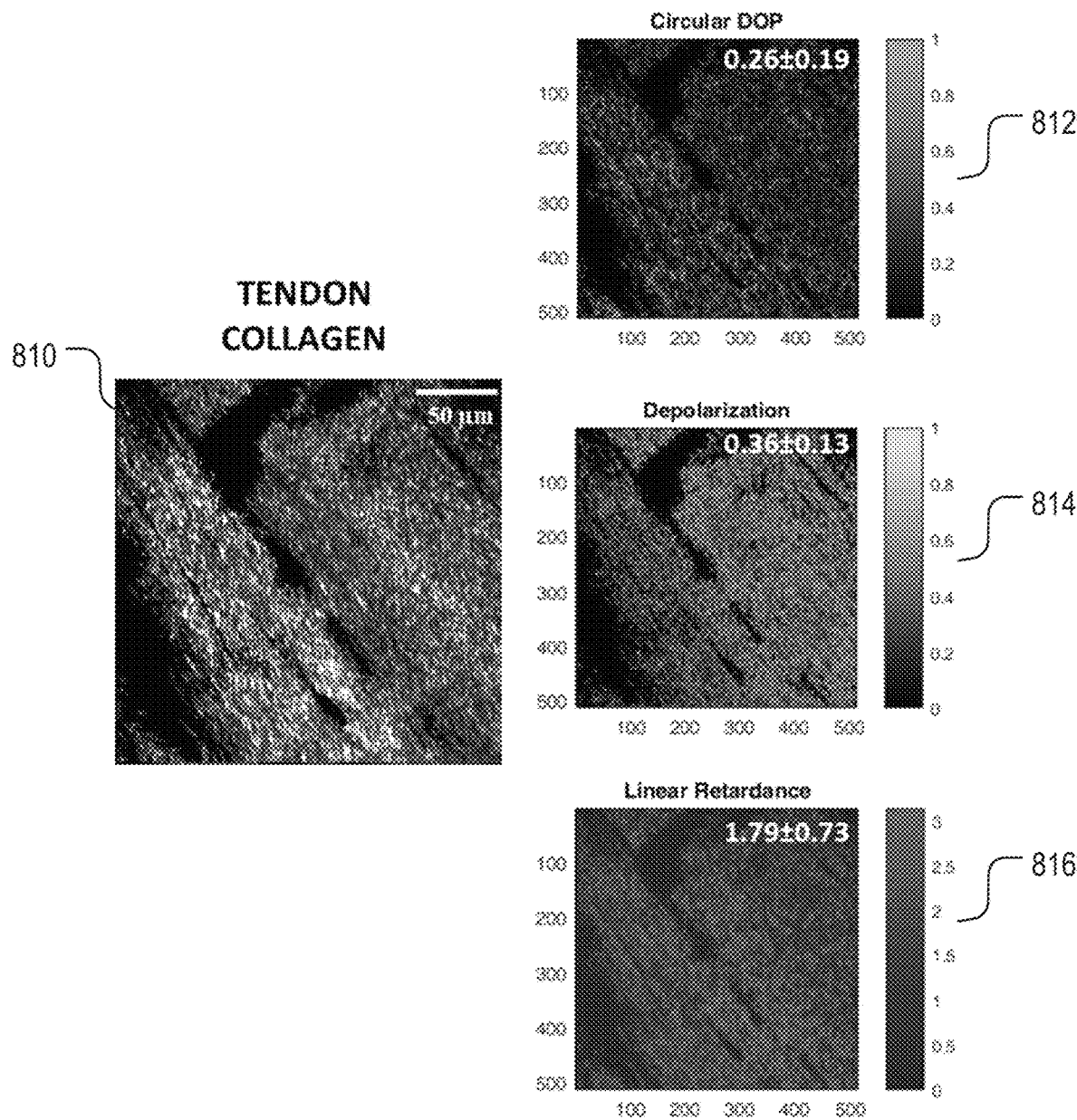
FIGS. 8A-8B show comparison between selected polarization parameter maps of collagen in porcine tendon and posterior cruciate ligament (PCL).
Figure 8B:
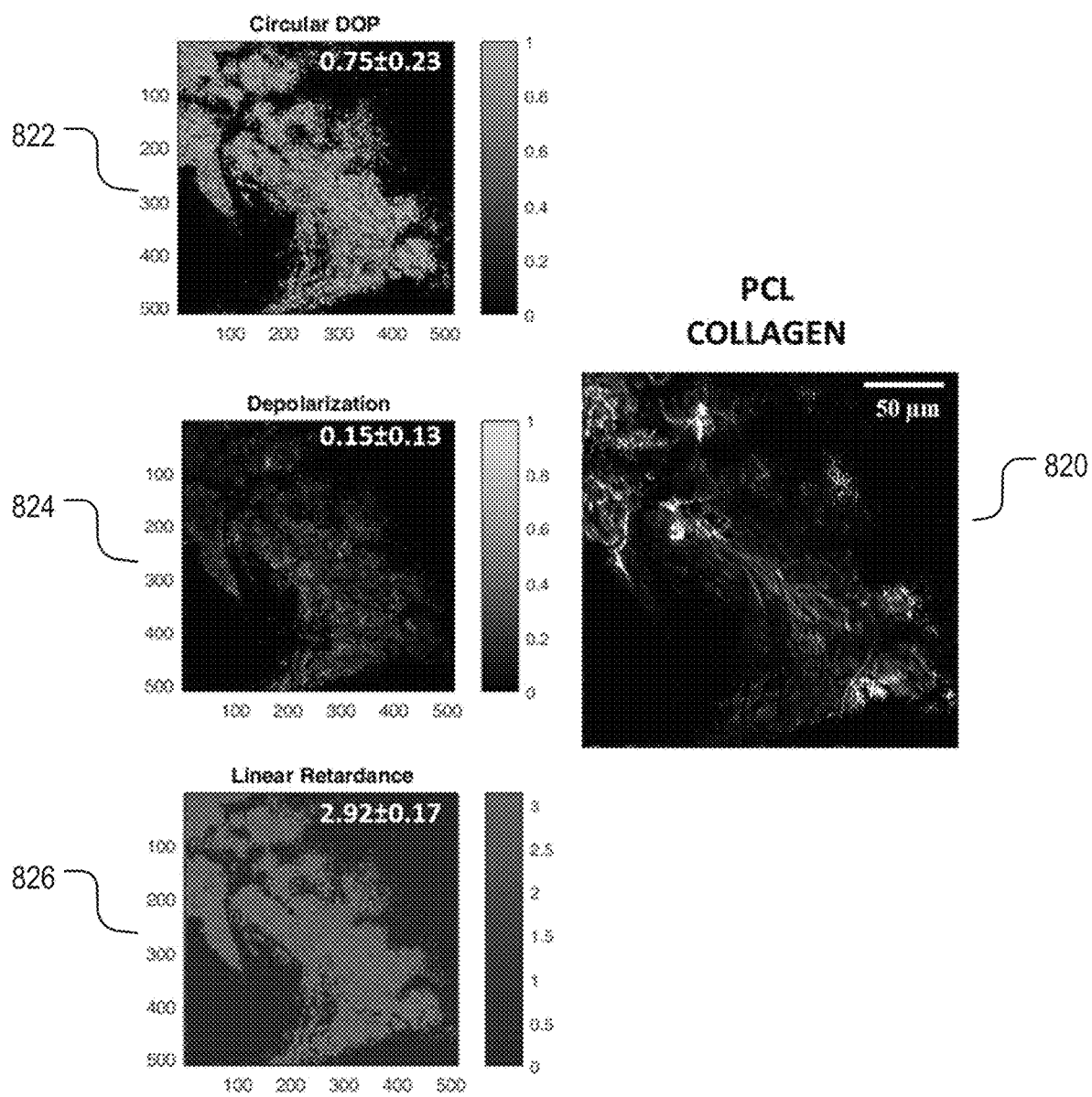

In another implementation, FIGS. 8A-8B show comparison between selected polarization parameter maps of collagen in porcine tendon and PCL. The color bars represent the range of allowed values for each polarization metric. The inset values at the top right hand of the images are the average parameter values per pixel that contributes to signal, along with the standard deviation.

FIG. 8A shows the tendon collagen 810 with circular degree of polarization (DOP) 812, depolarization 814, and linear retardance 816. FIG. 8B shows the PCL collagen 820 with circular degree of polarization (DOP) 822, depolarization 824, and linear retardance 826. On average, PCL may have higher circular DOP values (0.75) than tendon (0.25). This may imply that circularly polarized light preserves its polarization to a higher degree on passing through PCL. This observation may be supported by the depolarization map, since the reduction of circular DOP most likely contributes to the overall depolarization of the sample. Ligament and tendon are connective tissues that have parallel and tightly packed heterogeneous collagen fibers. Ligament may also include collagen bundles with spiral arrangement, and this additional organization variation may potentially explain the preferential response to circularly polarized light. Furthermore, the linear retardance of tendon collagen may be less than that of PCL collagen. Since linear retardance is related to the birefringence of the sample, this may infer that the PCL region imaged may have higher birefringence than tendon, which may be another effect of a spiral/helical fiber arrangement.

Various method may be used to compare values for different parameters. In one implementation, a comparison of values for different parameters may be performed using greatest differences in mean values. In another implementation, a comparison of values for different parameters may be performed using an independent samples t-test, in which one or more selected metrics between varying pathologies of samples are used to study the significance of differences.

Figure 9A:
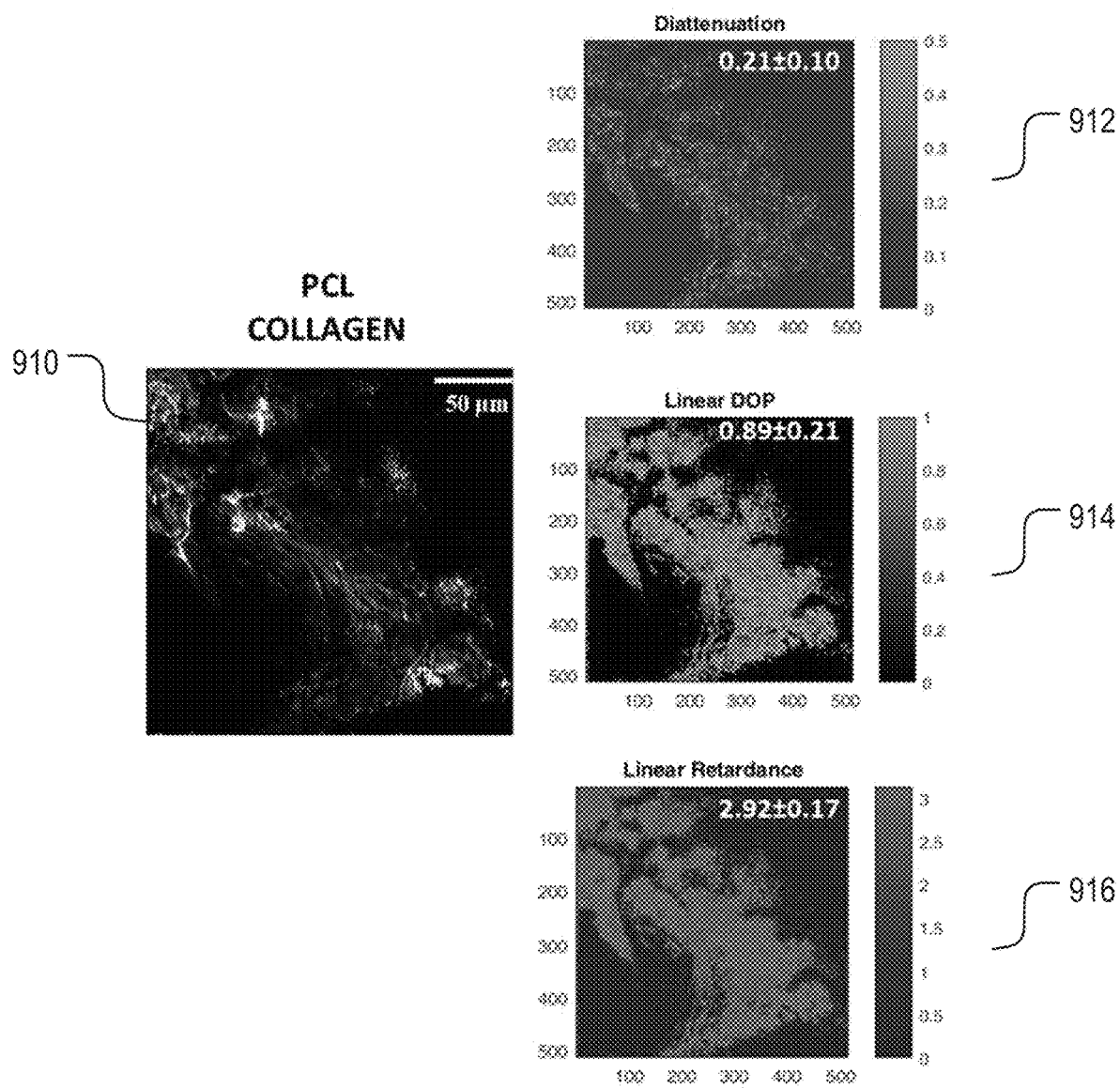
FIGS. 9A-9B show comparison between selected polarization parameter maps for collagen and extrafibrillar matrix plus cell (EFMC) in porcine PCL
Figure 9B:
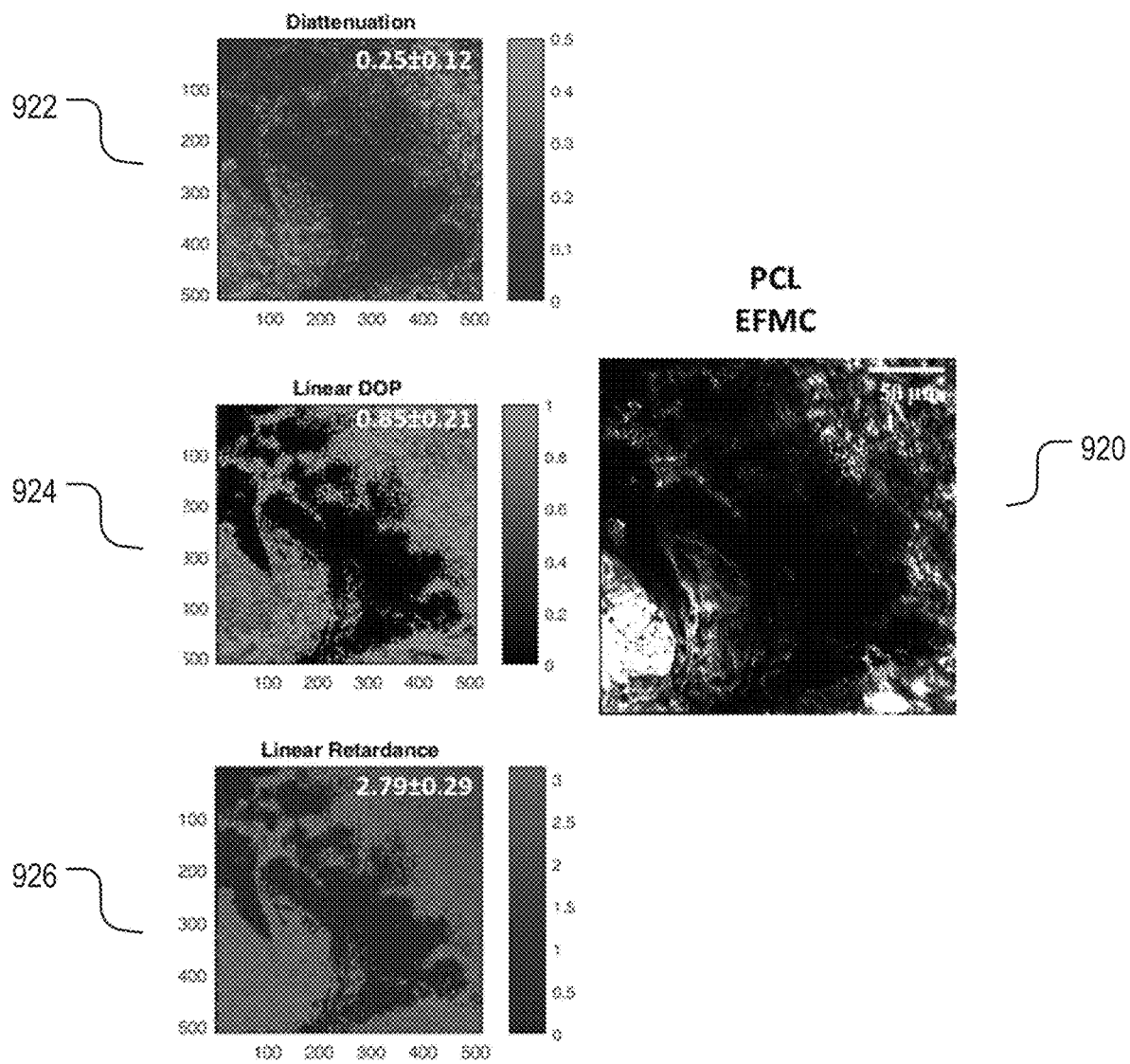

In another implementation, FIGS. 9A-9B show comparison between selected polarization parameter maps for col-lagen and extrafibrillar matrix plus cell (EFMC) in porcine PCL. The color bars represent the range of allowed values for each polarization metric, apart from diattenuation, whose range has a maximum at 0.5 to increase contrast. The inset values at the top right hand of the images are the average parameter values per pixel that contributes to signal, along with the standard deviation.

FIG. 9A shows the PCL collagen 910 with diattenuation 912, linear DOP 914, and linear retardance 916. FIG. 9B shows the PCL EFMC 920 with diattenuation 922, linear DOP 924, and linear retardance 926. The differences in mean values may be subtle in FIGS. 9A-9B. The polarization data may not show as much variation as the confocal images, and this may be due to additional isotropic absorption which varies across the region imaged, and affects intensity but not polarization information. The linear DOP may be preserved more for PCL collagen than PCL EFMC. This may suggest that there are more components that scatter linear polarization in the EFMC than in fibers. Furthermore, the higher average linear retardance may point to the relatively higher birefringence of collagen compared with EFMC. Increased presence of other EFMC components such as proteoglycan may cause lower linear birefringence, inferring that the EFMC may have an average lower linear retardance than collagen. Overlapping error bars may suggest that the observed differences are not statistically significant.

Figure 10A:
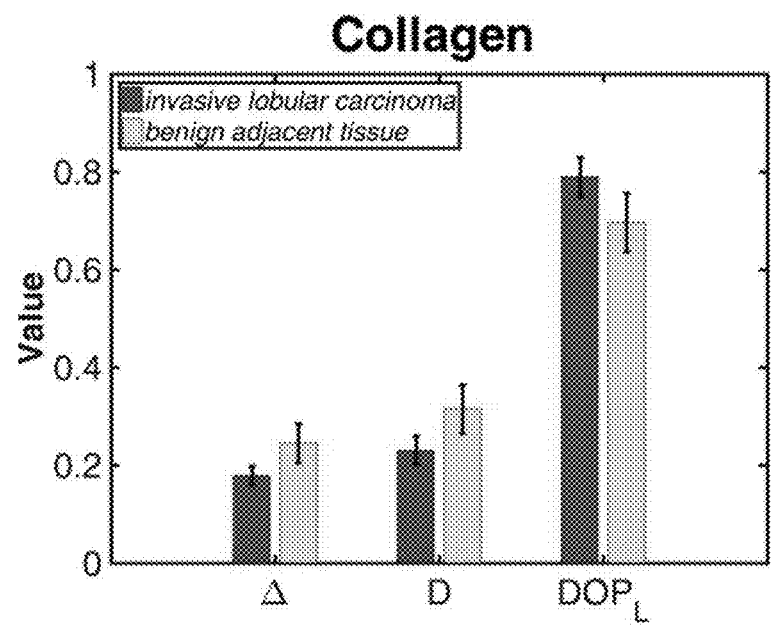
FIGS. 10A-10B show comparison between stromal collagen within tumor with stromal collagen in benign tissue adjacent to tumor for both collagen and the EFMC.
Figure 10B:
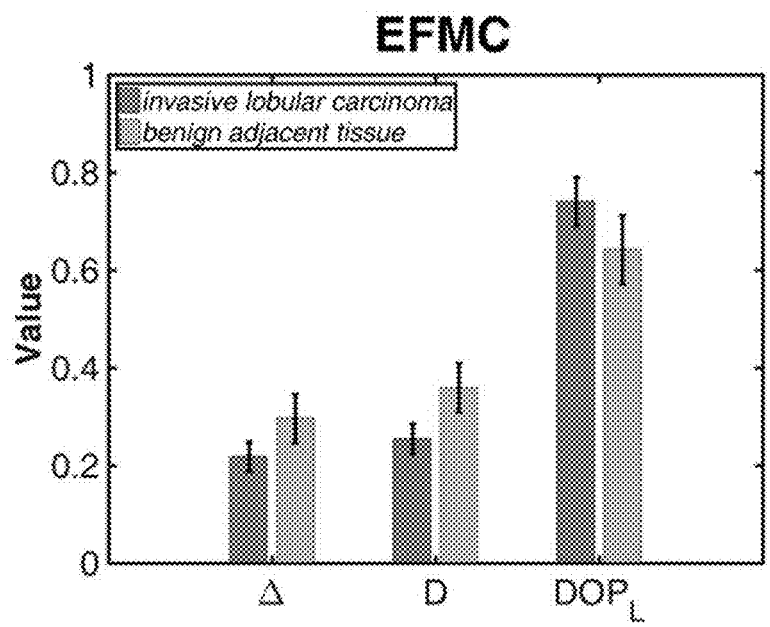

In another implementation, FIGS. 10A-10B show comparison between stromal collagen within tumor (ILC) with stromal collagen in benign tissue adjacent to tumor (BAT) for both collagen and the EFMC. FIGS. 10A-10B may exhibit similar trend of lower depolarization, lower diattenuation and higher linear degree-of-polarization for stromal collagen within malignant tissue. In one implementation, SPPARC microscopy may be performed on 47 regions comprising 23 ILC and 24 benign regions (11 BT and 13 BAT sections), showing the greatest parameter differences from collagen in ILC may come from those in BAT sections. This may suggest that the collagen optical properties change most in the vicinity of tumors.

FIGS. 10A-10B show error bar comparisons of different parameters between collagen and the EFMC in BAT and ILC. An independent-samples t-test may be carried out to compare selected polarization metrics between BAT and ILC for both collagen and the EFMC. For collagen, there may be significant differences in the comparison of depolarization parameter Δ ($p \approx 0.001$), diattenuation parameter D ($p \approx 0.047$), and linear degree-of-polarization (DOPL) parameter ($p \approx 0.001$). A significance level may be taken as 0.05. There may be significant differences for the EFMC comparison yielding p values of 0.002, 0.028 and 0.002 for A, D and $DOP_L$ respectively. Stromal collagen within malignant tissues may show average lower Δ values than in BAT, which may be due to the fact that malignancy may induce less optical scattering, and hence less polarization decoherence, as a result of stiffening of the surrounding stromal collagen. Stromal stiffening may be an effect of increased matrix deposition leading to cross-linking in the tumor micro-environment. A similar trend of reduced D for stromal collagen within ILC may imply a reduction of preferential absorption of incident polarized light. This may be due to the loss in general optical anisotropy in stromal collagen, influenced by the haphazard growth and invasive behavior of the tumor. $DOP_L$ may show the reverse trend, with stromal collagen in ILC preserving linear degree-of-polarization more than collagen in BAT. The overall stromal collagen relationship may be for the EFMC, although there may appear to be slightly higher spread in the parameter variation as captured by the standard deviation. In the retardance (R) data obtained for both collagen and the EFMC, there may be significant overlap between the error bars.

Mueller Matrix Calculation

The present disclosure describes a method for decomposing Mueller matrix.

The Mueller matrix formalism may deal with intensities rather than fields, which may enable a mathematical description that accommodates the depolarization phenomena. A Mueller matrix linearly may relate an input to an output Stokes vector via matrix multiplication given by $$S_0 = MS_i \quad (1)$$

where $$M = \begin{pmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{pmatrix}$$

may be a 4×4 Mueller matrix, and $S_i$ and $S_o$ may be the input and output Stokes vectors, respectively. To obtain representative Mueller matrices of tissues, multiple Stokes vector measurements may be taken. For a given set of input Stokes vectors and a minimum of 4 independent output Stokes vector measurements, M may be uniquely determined by concatenating the vectors into matrices, and inverting such that $$M = (S_{o1}\, S_{o2}\, S_{o3}\, S_{o4})(S_{i1}\, S_{i2}\, S_{i3}\, S_{i4})^{-1}. \quad (2)$$

Due to noise in measurements, it may be desirable to "over-sample" by taking more measurements, and then use the least squares estimate of the inverse $$M = (S_{o1} \ldots S_{on})(S_{i1} \ldots S_{in})_P^{-1}, \quad (3)$$

where $(\ )_P^{-1}$ may represent the pseudo-inverse operator and n (>4) may be the number of PSG configurations used in the measurements.

MMPD may decompose the derived Mueller matrices into three matrices: the diattenuation, retardance and depolarization matrices such that $$M = M_\Delta M_R M_D \cdot M_\Delta = \begin{pmatrix} 1 & \vec{0}^T \\ \vec{P}_\Delta & m_\Delta \end{pmatrix},$$

$$M_R = \begin{pmatrix} 1 & \vec{0}^T \\ \vec{0} & m_R \end{pmatrix}, M_D = \begin{pmatrix} 1 & \vec{D}^T \\ \vec{D} & m_D \end{pmatrix},$$

where $m_\Delta$, $m_R$ and $m_D$ are the 3×3 depolarization, retardance and diattenuation sub-matrices respectively, $\vec{P}_\Delta$ is the polarizance vector and $\vec{D}$ is the diattenuation vector. Scalar parameters, derived from the full matrix and sub-matrices, may offer quantitative insight of physically relatable metrics, which are more intuitive for description of the systems. Table 1 lists some common scalar parameters, and their respective definitions, that can be extracted using MMPD analysis. These parameters were chosen based on their sensitivity to sample differences during experiments and their generally intuitive definitions.

The present disclosure describes a method and apparatus for performing patterned microscopy, particularly multi-modal SPPARC microscope. In one embodiment, three-dimensional SHG-patterned confocal microscopy images of collagen fibers may be obtained. The method may include linear polarimetric analysis and matrix decomposition methods and apply them to these images to obtain rich polarization information.

The present disclosure also describes a method and apparatus for performing SPPARC microscopy, which may allow label-free quantitative analysis of the EFMC. The method may include MMPD as a decomposition approach. In one embodiment, differences in average parameter values between tendon and PCL collagen may be obtained, and changes in parameters across layers for collagen in tendon may be analyzed.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for performing patterned microscopy, the method comprising:
   obtaining a microscopy image of an object based on optical signal from the object in response to a first incoming optical beam by:
       generating a plurality of polarization states of the first incoming optical beam,
       for each of the plurality of polarization states of the first incoming optical beam, analyzing a plurality of polarization states of the optical signal from the object, wherein the plurality of polarization states of optical signal depend on the polarization state of the first incoming optical beam and a portion of the object that interacts with the first incoming optical beam, and
       obtaining the microscopy image of the object based on the plurality of the first incoming optical beam and the analyzed polarization states of the optical signal;
   obtaining a contrast-enhancing image based on optical signal from the object in response to a second incoming optical beam;
   generating a patterned mask based on the contrast-enhancing image; and
   applying the patterned mask on the microscopy image to obtain a patterned microscopy image.

2. The method according to claim 1, wherein:
   the first incoming optical beam and the second incoming optical beam are a same optical beam; and
   obtaining the microscopy image is same time as obtaining the contrast-enhancing image.

3. The method according to claim 1, wherein:
   the microscopy image comprises a polarimetric confocal microscopy image.

4. The method according to claim 1, further comprising:
   performing an optical setup characterization process to obtain a forward Mueller matrix $M_F$ and a backward Mueller matrix $M_B$.

5. The method according to claim 4, wherein the performing the optical setup characterization process to obtain the forward Mueller matrix $M_F$ and the backward Mueller matrix $M_B$ comprises:
   obtaining the forward Mueller matrix $M_F$;
   obtaining a forward-backward Mueller matrix $M_{FB}$; and
   obtaining the backward Mueller matrix $M_B$ based on $M_{FB} = M_B M_{mirror} M_F$, wherein $$M_{mirror} = \begin{pmatrix} 1 & 0 & 0 & 0 \\ 0 & 1 & 0 & 0 \\ 0 & 0 & -1 & 0 \\ 0 & 0 & 0 & -1 \end{pmatrix}$$

is an ideal mirror Mueller matrix reflecting at normal incidence.

6. The method according to claim 4, wherein the obtaining the microscopy image of the object based on the plurality of the first incoming optical beam and the analyzed polarization states of the optical signal comprises:
   obtaining a measured Mueller matrix M measured based on the plurality of the first incoming optical beam and the analyzed polarization states of the optical signal;
   obtaining a sample Mueller matrix $M_{sample}$ based on the measured Mueller matrix $M_{measured}$, the forward Mueller matrix $M_F$, and the backward Mueller matrix $M_B$ via $M_{sample} = (M_B)_P^{-1} M_{measured} (M_F)_P^{-1}$, wherein $O_P^{-1}$ is a pseudo-inverse operator; and
   obtaining the microscopy image of the object based on the sample Mueller matrix $M_{sample}$.

7. The method according to claim 6, wherein the obtaining the microscopy image of the object based on the sample Mueller matrix $M_{sample}$ comprises:
   calculating a scalar metric parameter based on the sample Mueller matrix $M_{sample}$ wherein the scalar metric parameter comprises one of diattenuation, depolarization, linear retardance, linear degree of polarization (DOP), or circular DOP; and
   obtaining the microscopy image of the object based on the calculated scalar metric parameter.

8. The method according to claim 7, further comprising:
   calculating a second scalar metric parameter based on the sample Mueller matrix $M_{sample}$, wherein the scalar metric parameter comprises one of diattenuation, depolarization, linear retardance, linear degree of polarization (DOP), or circular DOP; and
   obtaining a second microscopy image of the object based on the calculated second scalar metric parameter.

9. The method according to claim 1, wherein:
   the contrast-enhancing image comprises at least one of an optical frequency generation based microscopy image, a spectroscopy based image, or an optical coherence tomography image, wherein:
      the optical frequency generation based microscopy image comprises one of a second-harmonic generation (SHG) microscopy image, a third-harmonic generation (THG) microscopy image, a sum-frequency generation microscopy image, or a difference-frequency generation microscopy image; and
      the spectroscopy based image comprises one of a stimulated Raman spectroscopy (SRS) microscopy image or a coherent Raman scattering (CSRS and CARS) microscopy image.

10. The method according to claim 1, wherein the generating the patterned mask based on the contrast-enhancing image comprises:
   for each pixel of the contrast-enhancing image:
      determining whether a pixel value of the pixel of the contrast-enhancing image is smaller than a threshold;
      in response to the determination that the pixel value of the pixel of the contrast-enhancing image is smaller than the threshold, setting a pixel value of a corresponding pixel of the patterned mask as 0; and
      in response to the determination that the pixel value of the pixel of the contrast-enhancing image is not smaller than the threshold, setting the pixel value of the corresponding pixel of the patterned mask as 1.

11. The method according to claim 10, further comprising:
   determining the threshold based on a maximum intensity and a signal-to-noise ratio of the contrast-enhancing image.

12. The method according to claim 11, wherein the determining the threshold based on the maximum intensity and the signal-to-noise ratio of the contrast-enhancing image comprises:
   determining the threshold by calculating a product of a pre-determined percentage and the maximum intensity, wherein the per-determined percentage is determined based on the signal-to-noise ratio of the contrast-enhancing image.

13. The method according to claim 1, wherein:
   the microscopy image comprises a polarization-analyzed reflection confocal microscopy image;
   the contrast-enhancing image comprises a second-harmonic generation microscopy image;
   the patterned mask comprises a binary mask;
   the patterned microscopy image comprises a second-harmonic patterned polarization-analyzed reflection confocal microscopy image; and
   the object comprises collagen.

14. An apparatus for performing patterned microscopy on a subject, the apparatus comprising:
   an optical setup comprising a plurality of optical components;
   a memory storing instructions; and
   a processor in communication with at least a portion of the optical setup and the memory, wherein, when the processor executes the instructions, the processor is configured to cause the apparatus to:
      obtain a microscopy image of an object based on optical signal from the object in response to a first incoming optical beam by:
         generating a plurality of polarization states of the first incoming optical beam,
         for each of the plurality of polarization states of the first incoming optical beam, analyzing a plurality of polarization states of the optical signal from the object, wherein the plurality of polarization states of optical signal depend on the polarization state of the first incoming optical beam and a portion of the subject that interacts with the first incoming optical beam, and
         obtaining the microscopy image of the object based on the plurality of the first incoming optical beam and the analyzed polarization states of the optical signal;

obtain a contrast-enhancing image based on optical signal from the object in response to a second incoming optical beam;

generate a patterned mask based on the contrast-enhancing image; and apply the patterned mask on the microscopy image to obtain a patterned microscopy image.

15. The apparatus according to claim 14, wherein: the optical setup comprises a polarization state generator (PSG), a polarization state analyzer (PSA), and an optical detector, all of which are in communication the processor.

16. The apparatus according to claim 15, wherein, when the processor executes the instructions, the processor is configured to further cause the apparatus to:

obtain a forward Mueller matrix $M_F$;

obtain a forward-backward Mueller matrix $M_{FB}$; and obtain a backward Mueller matrix $M_B$ based on $M_{FB}=M_B M_{mirror} M_F$, wherein $$M_{mirror} = \begin{pmatrix} 1 & 0 & 0 & 0 \\ 0 & 1 & 0 & 0 \\ 0 & 0 & -1 & 0 \\ 0 & 0 & 0 & -1 \end{pmatrix}$$

is an ideal mirror Mueller matrix reflecting at normal incidence.

17. The apparatus according to claim 16, wherein, when the processor is configured to cause the apparatus to obtain the microscopy image of the object based on the plurality of the first incoming optical beam and the analyzed polarization states of the optical signal, the processor is configured to cause the apparatus to:

obtain a measured Mueller matrix $M_{measured}$ based on the plurality of the first incoming optical beam and the analyzed polarization states of the optical signal;

obtain a sample Mueller matrix M sample based on the measured Mueller matrix $M_{measured}$, the forward Mueller matrix $M_F$, and the backward Mueller matrix $M_B$ via $M_{sample}=(M_B)_P^{-1} M_{measured}(M_F)_P^{-1}$, wherein $O_p^{-1}$ is a pseudo-inverse operator; and obtaining the microscopy image of the object based on the sample Mueller matrix $M_{sample}$.

18. The apparatus according to claim 14, wherein:

the optical setup comprises a polarization state generator (PSG), a polarization state analyzer (PSA), a first optical detector, and a second optical detector, all of which are in communication the processor;

the microscopy image comprises a polarization-analyzed reflection confocal microscopy image;

the contrast-enhancing image comprises a second-harmonic generation microscopy image;

the patterned mask comprises a binary mask; and the patterned microscopy image comprises a second-harmonic patterned polarization-analyzed reflection confocal microscopy image.

19. A non-transitory computer readable storage medium storing instructions, the instructions, when executed by a processor, cause the processor to perform:

obtaining a microscopy image of an object based on optical signal from the object in response to a first incoming optical beam by:

generating a plurality of polarization states of the first incoming optical beam, for each of the plurality of polarization states of the first incoming optical beam, analyzing a plurality of polarization states of the optical signal from the object, wherein the plurality of polarization states of optical signal depend on the polarization state of the first incoming optical beam and a portion of the subject that interacts with the first incoming optical beam, and obtaining the microscopy image of the object based on the plurality of the first incoming optical beam and the analyzed polarization states of the optical signal;

obtaining a contrast-enhancing image based on optical signal from the object in response to a second incoming optical beam;

generating a patterned mask based on the contrast-enhancing image; and applying the patterned mask on the microscopy image to obtain a patterned microscopy image.

* * * * *

UNITED STATES PATENT AND TRADEMARK OFFICE
CERTIFICATE OF CORRECTION

PATENT NO. : 11,010,881 B2  
APPLICATION NO. : 16/411764  
DATED : May 18, 2021  
INVENTOR(S) : Kimani C. Toussaint et al.

Page 1 of 1

It is certified that error appears in the above-identified patent and that said Letters Patent is hereby corrected as shown below:

In the Claims

In Column 21, Claim 6, Line 23, delete "M measured" and insert in its place -- $M_{measured}$ --.

In Column 21, Claim 6, Line 29, between "$M_{sample}$" and "$(M_B)_P^{-1}$", insert -- = --.

In Column 21, Claim 6, Line 29, delete "$O_P^{-1}$" and insert in its place -- $()_P^{-1}$ --.

In Column 23, Claim 17, Line 42, delete "$M_{sample}=(M_B)_P^{-1}M_{measured}(M_F)_P^{-1}$" and insert in its place -- $M_{sample}=(M_B)_P^{-1}M_{measured}(M_F)_P^{-1}$ --.

In Column 23, Claim 17, Line 42, delete "$O_P^{-1}$" and insert in its place -- $()_P^{-1}$ --.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*